United States Patent
Higuchi et al.

(10) Patent No.: US 9,074,906 B2
(45) Date of Patent: Jul. 7, 2015

(54) ROAD SHAPE RECOGNITION DEVICE

(75) Inventors: Mirai Higuchi, Mito (JP); Morihiko Sakano, Hitachinaka (JP); Takeshi Shima, Mito (JP); Shoji Muramatsu, Hitachinaka (JP); Tatsuhiko Monji, Hitachinaka (JP)

(73) Assignee: Hitachi Automotive Systems, Ltd., Hitachinaka-shi (JP)

( * ) Notice: Subject to any disclaimer, the term of this patent is extended or adjusted under 35 U.S.C. 154(b) by 748 days.

(21) Appl. No.: 13/387,137

(22) PCT Filed: Jul. 23, 2010

(86) PCT No.: PCT/JP2010/062416
§ 371 (c)(1),
(2), (4) Date: Mar. 7, 2012

(87) PCT Pub. No.: WO2011/013586
PCT Pub. Date: Feb. 3, 2011

(65) Prior Publication Data
US 2012/0185167 A1      Jul. 19, 2012

(30) Foreign Application Priority Data

Jul. 29, 2009   (JP) .................. 2009 176015

(51) Int. Cl.
G06K 9/00      (2006.01)
G01C 21/26     (2006.01)
G01C 21/36     (2006.01)
G06T 7/00      (2006.01)
G08G 1/16      (2006.01)

(52) U.S. Cl.
CPC ............ *G01C 21/3602* (2013.01); *G06T 7/004* (2013.01); *G06T 2207/10021* (2013.01); *G06T 2207/30256* (2013.01); *G08G 1/167* (2013.01); *G06K 9/00798* (2013.01)

(58) Field of Classification Search
CPC ....... B60R 1/00; G01C 11/06; G06K 9/00798
USPC .......................................... 701/461; 382/104
See application file for complete search history.

(56) References Cited

U.S. PATENT DOCUMENTS 6,526,352 B1   2/2003   Breed et al.

FOREIGN PATENT DOCUMENTS

| EP | 1 886 891 A2 | 2/2008 |
| JP | 1-265399 A | 10/1989 |
| JP | 6-266828 A | 9/1994 |

(Continued)

OTHER PUBLICATIONS

International Search Report with English translation dated Nov. 2, 2010 (six (6) pages).

(Continued)

*Primary Examiner* — John Q Nguyen
*Assistant Examiner* — Kyung Kim
(74) *Attorney, Agent, or Firm* — Crowell & Moring LLP

(57) ABSTRACT

A road shape recognition device capable of accurately recognizing the road shape of a road that lies ahead in the travel direction of a vehicle is provided. A road shape recognition device 1 detects a road region of the road based on an image capturing a scene ahead in the travel direction of the vehicle, and estimates the shape of the road based on that road region. Thus, it is possible to accurately recognize road shapes over distances ranging from short to long.

18 Claims, 22 Drawing Sheets

(56) References Cited

FOREIGN PATENT DOCUMENTS

| JP | 9-81734 A | 3/1997 |
|---|---|---|
| JP | 2001-331787 A | 11/2001 |
| JP | 2006-24104 A | 1/2006 |
| JP | 2007-66047 A | 3/2007 |

OTHER PUBLICATIONS

Japanese-language Office Action dated Jun. 11, 2013 (Two (2) pages).

Extended European Search Report dated Sep. 26, 2013 (10 pages).

Chapuis et al. "Accurate Road Following and Reconstruction by Computer Vision" IEEE Transactions on Intelligent Transportation Systems, vol. 3, No. 4, Dec. 2002, pp. 261-270, NJ, USA.

Vlacic et al. "Intelligent Vehicle Technologies : Theory and Applications (Automotive Engineering Series)" Jan. 6, 2002, pp. 85-170.

Chapuis et al. "Road Detection and Vehicles Tracking by Vision for an On-Board ACC System in the VELAC Vehicle" Proceedings of the Third International Conference on Jul. 10-13, 2000, vol. 2, Jul. 10, 2000, pp. 11-18, NJ, USA.

Caraffi et al. "Off-Road Path and Obstacle Detection Using Decision Networks and Stereo Vision" IEEE Transactions on Intelligent Transportation Systems, vol. 8, No. 4, Dec. 2007, pp. 607-618, NJ, USA.

Fig. 6
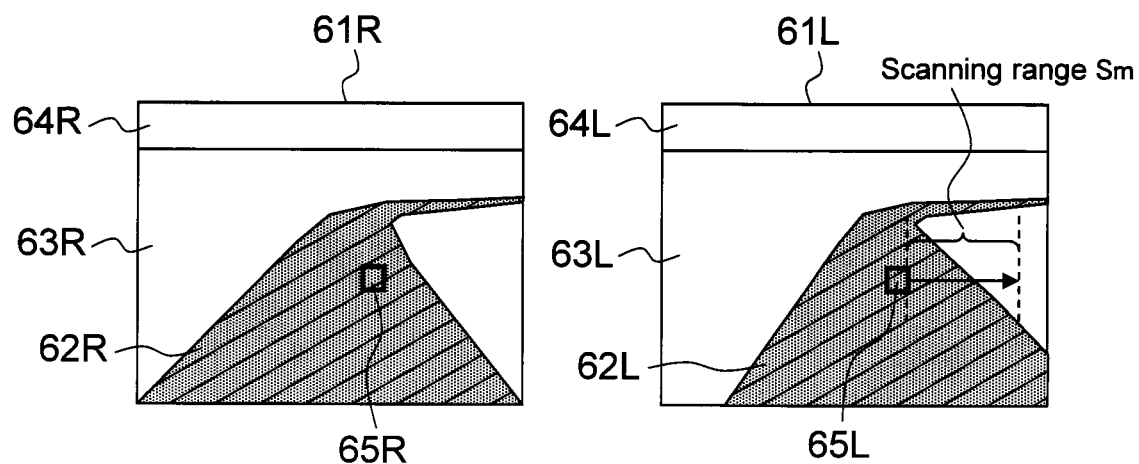
(a)
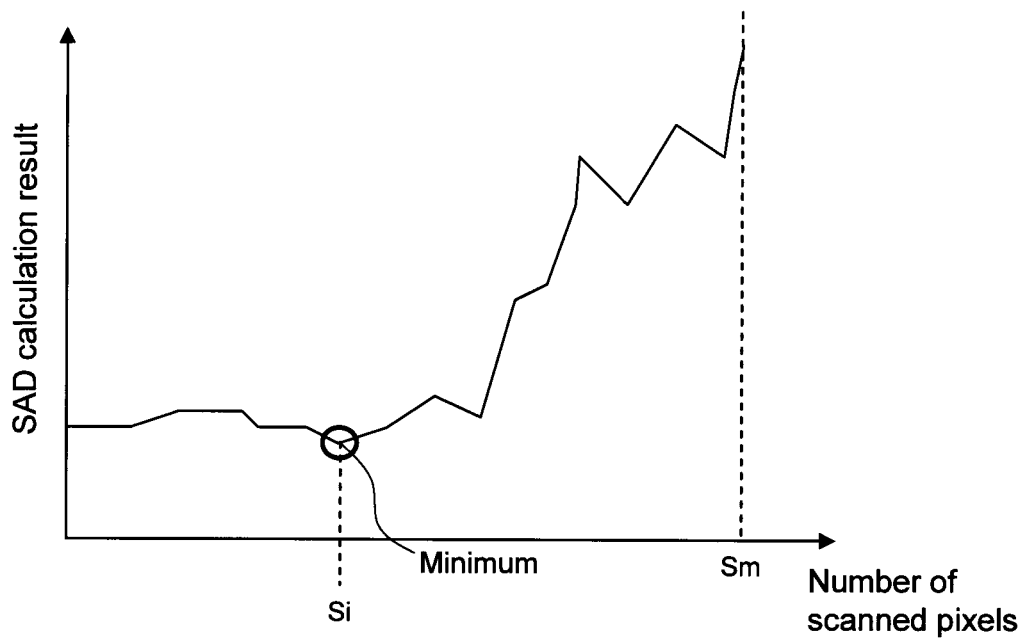
(b)

Fig. 7
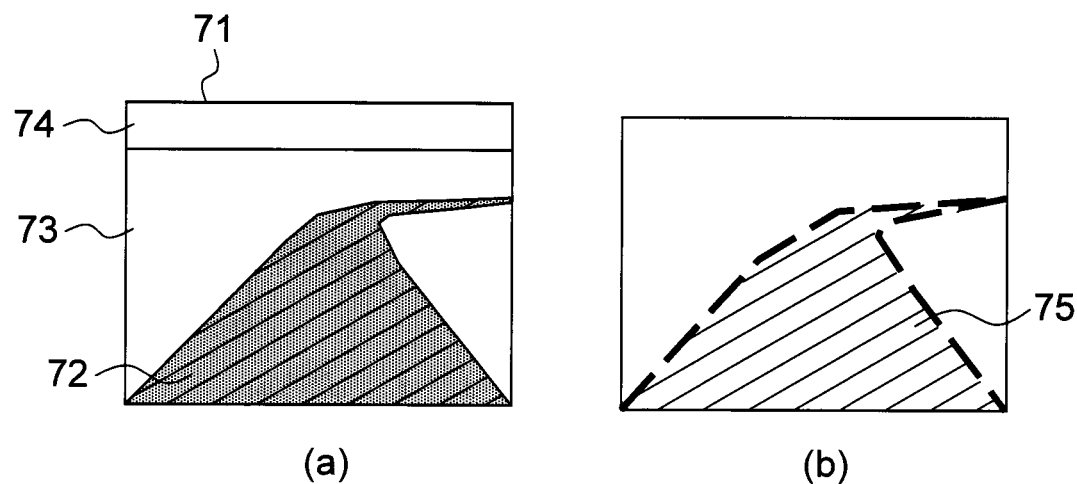
(a)    (b)
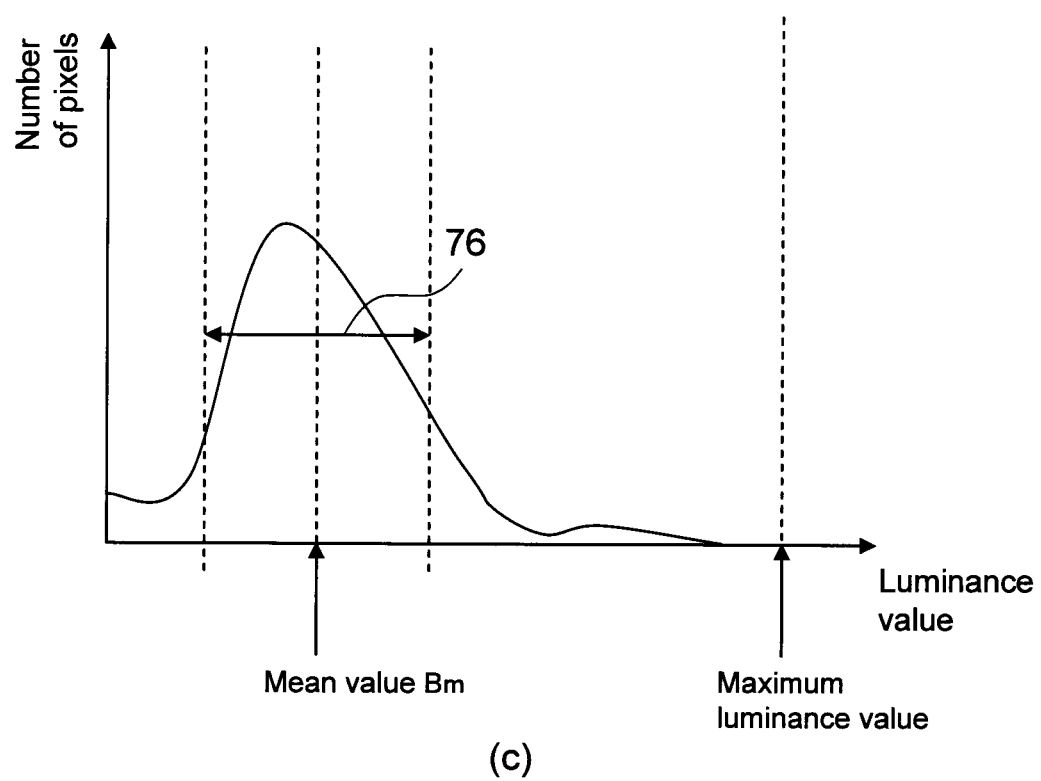
(c)

Fig. 8
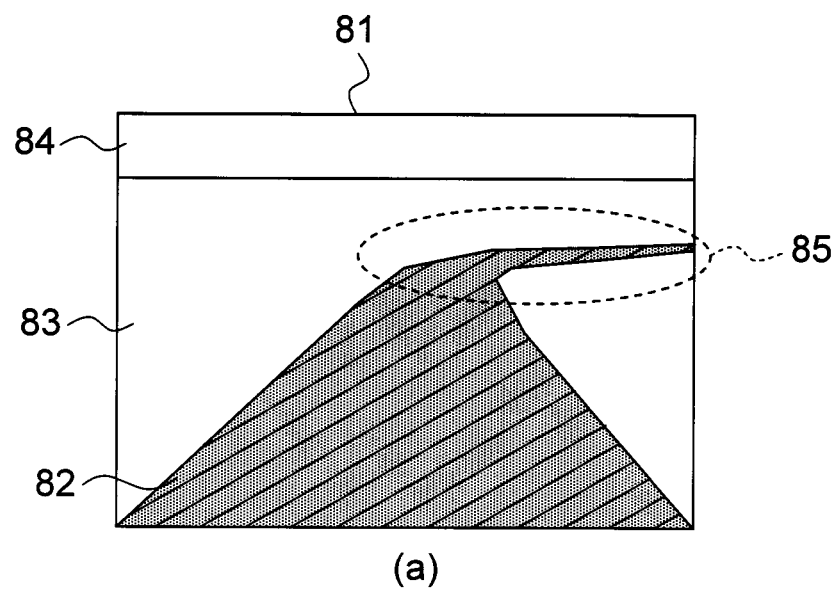
(a)
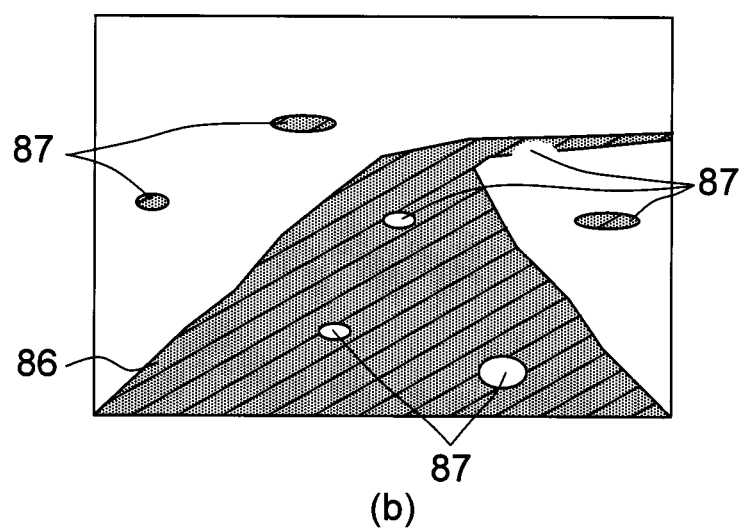
(b)

Fig. 9
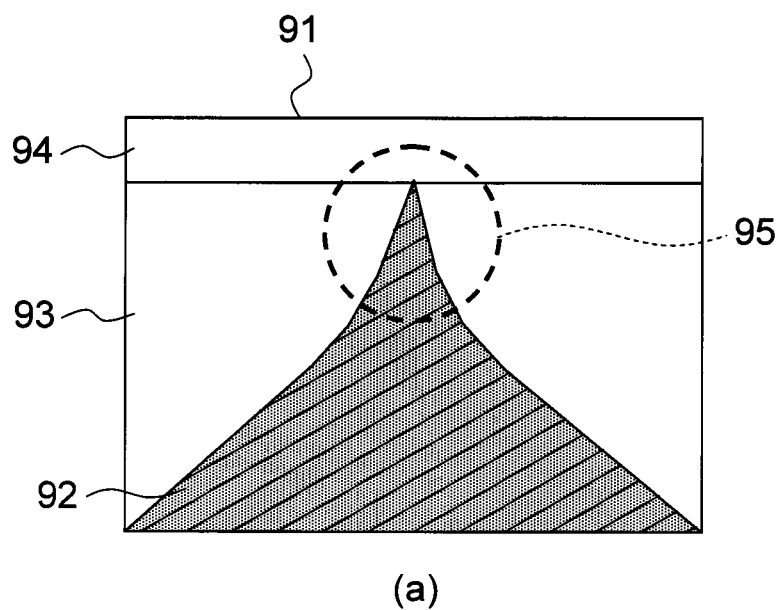
(a)
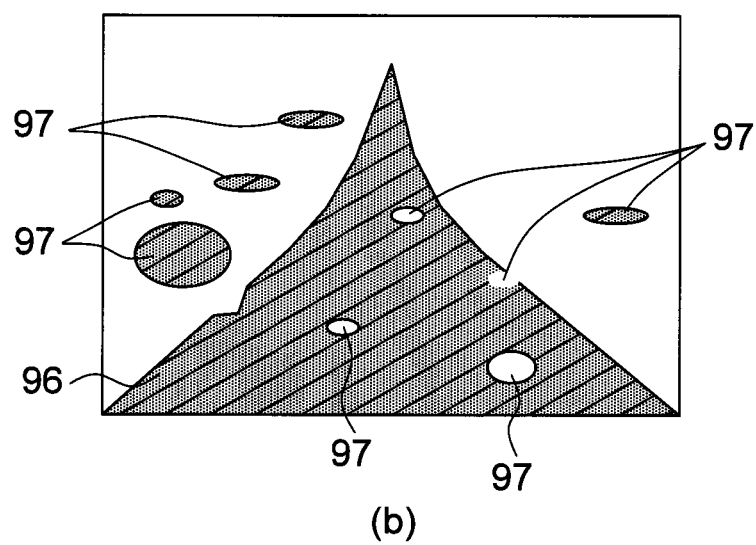
(b)

Fig. 13
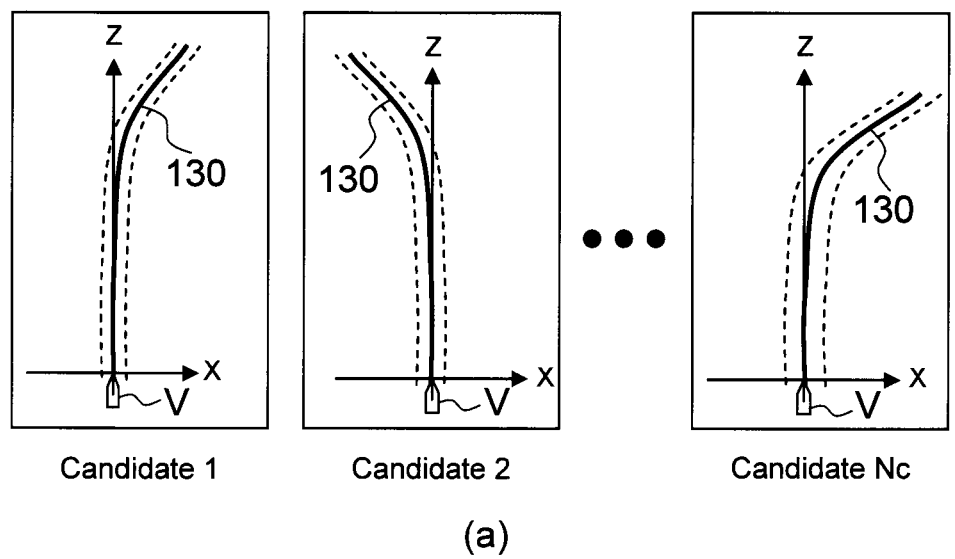
Candidate 1   Candidate 2   Candidate Nc
(a)
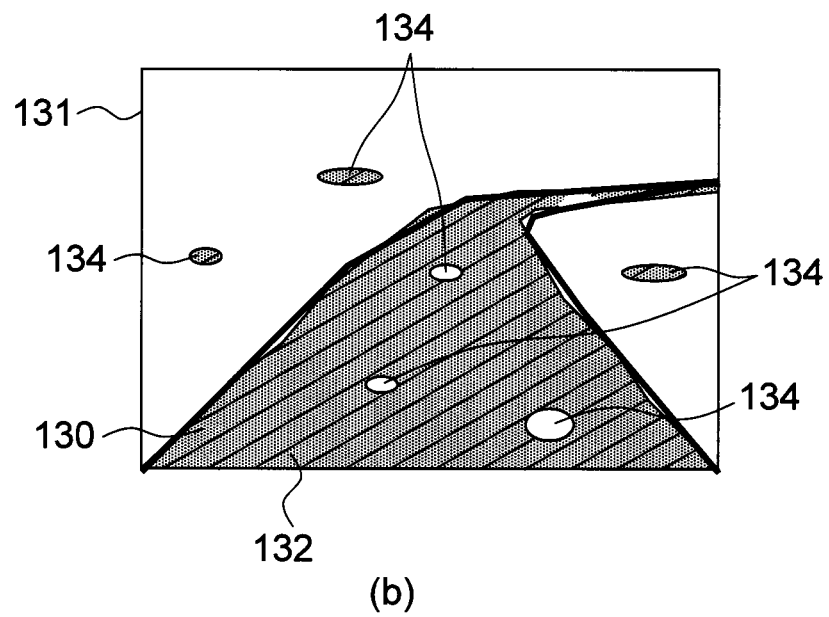
(b)

ROAD SHAPE RECOGNITION DEVICE

TECHNICAL FIELD

The present invention relates to a road shape recognition device, and, more particularly, to a road shape recognition device that recognizes the shape of a road that lies ahead in the travel direction of a host vehicle.

BACKGROUND ART

Adaptive cruise control (ACC) where the vehicle speed of the host vehicle is controlled in accordance with the vehicle speed of a vehicle ahead using a radar, etc., has seen application in products. Further, in recent years, there has been proposed an ACC technique in which a curve ahead of the host vehicle is detected using a navigation system, and deceleration is automatically performed at the curve.

With such systems where the vehicle is controlled or a warning is given to the driver based not only on the travel state of the host vehicle but also on information on road shapes, etc., there are problems such as the occurrence of a lag in control/warning timing, etc., due to such influences as detection errors with respect to road shapes, changes in road shapes due to construction work, calculation errors with respect to the distance from the host vehicle to a predetermined site, e.g., a curve, etc., and so forth. For this reason, a technique for measuring road shapes in real time and with high precision becomes important.

As a technique developed for such purposes, the technique disclosed in Patent Document 1 has conventionally been known. The conventional technique disclosed in Patent Document 1 is one in which stationary objects ahead of a vehicle are detected using a millimeter-wave radar, and, from among the detected stationary objects, only those stationary objects that are effective for road shape estimation are selected using previous processing results, and the yaw rate sensor and steering angle sensor of the vehicle, thereby estimating road shapes, such as curves, etc. In addition, it is one in which, instead of using previous processing results, a plurality of road shapes are hypothesized, effective stationary objects are selected per road shape, and those that resulted in the greatest number of selected stationary objects are selected as stationary objects that are effective for road shape estimation.

Patent Document 1: JP Patent Application Publication (Kokai) No. 2007-66047 A

DISCLOSURE OF THE INVENTION

Problems to be Solved by the Invention

However, with the method of Patent Document 1, since all it does is select three-dimensional objects based on the road shape of previous processing results, it becomes difficult to estimate road shapes with favorable precision if the road shape is discontinuous, or if the road shape had been erroneously estimated during previous processing, and so forth.

In addition, since, instead of selecting stationary objects based on the previous road shape, a process of selecting stationary objects is performed with respect to a plurality of road shapes, and the stationary objects from when the greatest number of stationary objects were selected are regarded effective, a three-dimensional object selection process needs to be performed for as many road shapes as there are, and there are problems such as the wrong stationary objects being selected under travel environments that include numerous three-dimensional objects besides three-dimensional objects that lie alongside the road shape, and so forth.

In addition, with respect to cases where only stationary objects that are effective for road shape estimation are selected using a yaw rate sensor and a steering angle sensor, thereby estimating a curve, since the steering wheel is not manipulated prior to entering the curve and no lateral acceleration takes place, there was a problem in that a curve could not be detected prior to entering the curve. In addition, with respect to roads that have no three-dimensional objects in their vicinity, it was, in principle, impossible to detect curves.

With respect to speed control, road deviation prevention, warning process, etc., that are in accordance with the road shape, e.g., a curve, etc., in order to perform vehicle control, a warning process, etc., that do not feel unnatural to the driver, it is necessary to recognize road shapes with high precision.

The prevent invention is made in view of the points above, and an object thereof is to provide a road shape recognition device that is capable of accurately recognizing the road shape of a road that lies ahead in the travel direction of the vehicle.

Means for Solving the Problems

A road shape recognition device of the present invention that solves the problems above is a road shape recognition device that recognizes a road shape of a road that lies ahead in the travel direction of a vehicle, wherein it captures an image ahead in the travel direction of the vehicle, detects a road region of the road based on the captured image, and estimates the road shape of the road based on the detected road region.

Effects of the Invention

With a road shape recognition device of the present invention, a road region of a road is detected from a captured image, and the road shape of the road is estimated based on the detected road region. Thus, with respect to the captured image, the road region of the road may be obtained with a large area, and the road shape may be recognized accurately over distances ranging from short to long. Accordingly, accurate recognition is possible even in the case of a distant road shape, for which it is difficult to detect objects such as white lines, curbs, etc., in a conventional manner, or of a road shape of a road on which there are no objects such as white lines, curbs, etc., or of a road shape of a road where white lines are present but that curves in the distance, making the detection of white lines difficult.

The contents of the specification and/or the drawings in Japanese Patent Application No. 2009-176015, from which the present application claims priority, are incorporated herein.

BRIEF DESCRIPTION OF THE DRAWINGS

FIG. 6 shows diagrams illustrating an example of a road region detection method, where (a) is a diagram showing left and right images captured by left and right cameras, and (b) is a chart showing an example of a series of correlation values.

FIG. 7 shows diagrams indicating an example of a road region detection method, where (a) is a right image captured by a right camera, (b) is a diagram showing a road region, and (c) is a diagram showing the luminance distribution and luminance range of the road region.

FIG. 8 shows diagrams indicating road region detection results, where (a) is a diagram showing an image capturing a road that curves to the right in the distance, and (b) is a diagram showing an example where a road region is detected based on the image in (a).

FIG. 9 shows diagrams indicating road region detection results, where (a) is a diagram showing an image capturing a road with an uphill slope in the distance, and (b) is a diagram showing an example where a road region is detected based on the image in (a).

FIG. 13 shows diagrams illustrating a road shape estimation method, where (a) is a diagram showing road shape model candidates, and (b) is a diagram showing a state where the road shape has been estimated by means of a road shape model.

Figure 1:
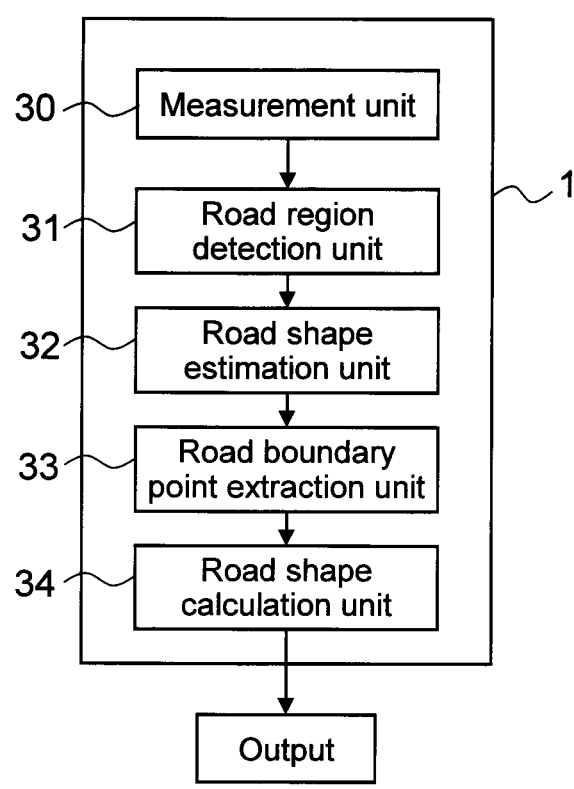
FIG. 1 is a functional block diagram of a road shape recognition device with respect to the first embodiment.

LIST OF REFERENCE NUMERALS 1, 1', 1'' . . . road shape recognition device, 2 . . . control unit, 3 . . . in-vehicle system, 4R . . . camera, 4L . . . camera, 6 . . . CPU, 7 . . . data ROM, 9 . . . RAM, 10 . . . program ROM, 11 . . . RAM, 12 . . . CPU, 13 . . . data ROM, 14 . . . program ROM, 15 . . . display, 19 . . . speaker, 20 . . . ignition switch, 21 . . . activation switch, 30 . . . measurement unit (image capturing unit), 31 . . . road region detection unit, 32 . . . road shape estimation unit, 33 . . . road boundary point extraction unit, 34 . . . road shape calculation unit, 40 . . . selection unit, 41 . . . first recognition unit, 42 . . . second recognition unit, 43 . . . road shape integration unit, 51 . . . object detection unit, 52 . . . road shape prediction unit, 53 . . . object selection unit, 54 . . . road shape estimation unit

BEST MODES FOR CARRYING OUT THE INVENTION

First Embodiment

Next, the first embodiment of the present invention is described in detail with reference to the drawings.

Figure 2:
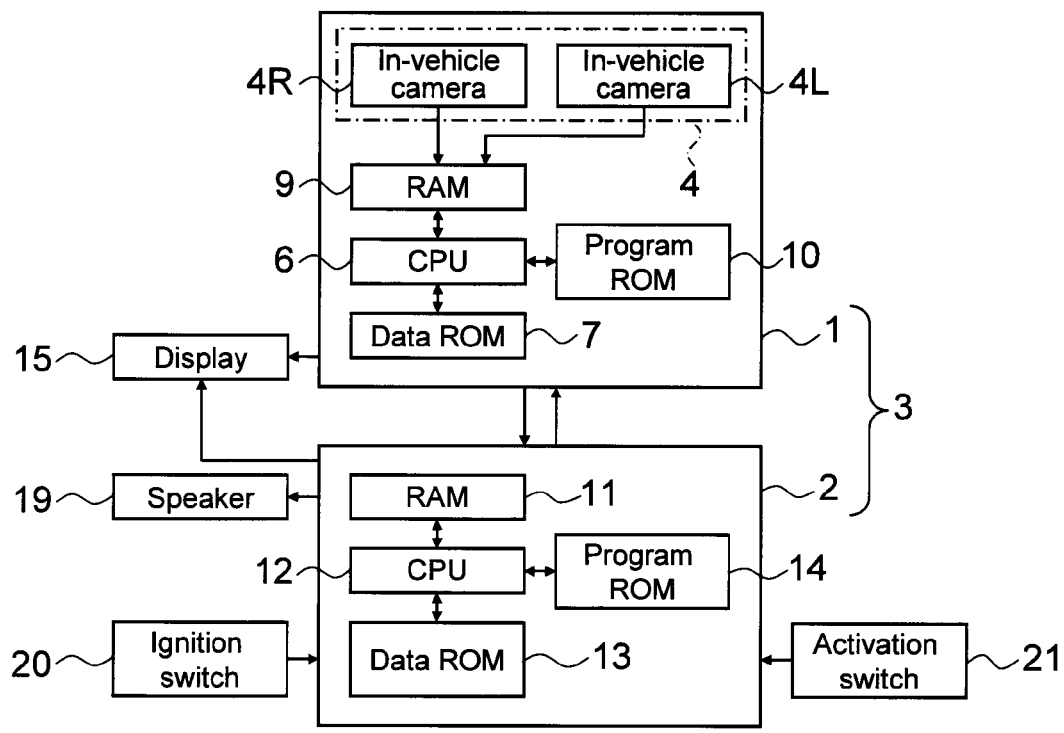
FIG. 2 is a configurational diagram of an in-vehicle system to which a road shape recognition device of the first embodiment is applied.

A road shape recognition device 1 has a measurement unit (image capturing unit) 30, which is shown in FIG. 1, configured with a plurality of cameras 4, and is applied to an in-vehicle system 3 such as that shown in FIG. 2. In the present embodiment, as shown in FIG. 2, a function for recognizing the environment around the vehicle is realized by means of a camera 4R (right camera) and a camera 4L (left camera). It is noted that the number of units for the cameras 4 is not limited to two, and they may comprise three or more units. In addition, the configuration may also be such that a control unit 2 that is separate from the cameras 4, or an image processing unit that is not shown, etc., imports and processes images from the cameras 4.

Figure 3:
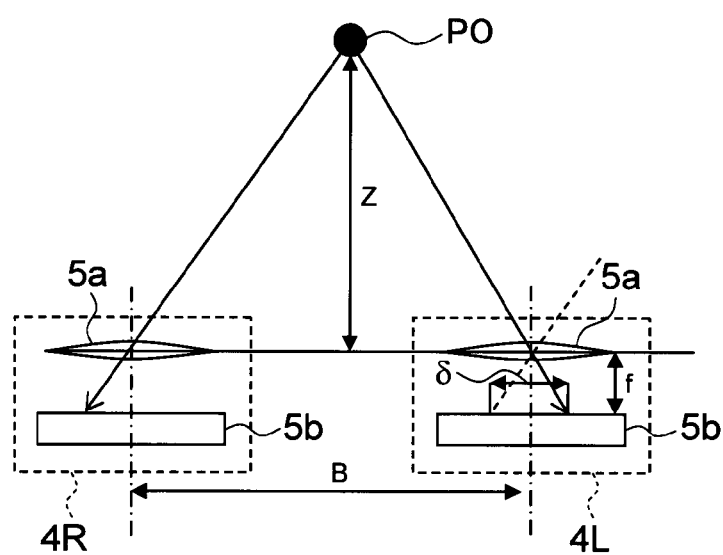
FIG. 3 is a diagram showing the principles of a stereo camera.

The road shape recognition device 1, as shown in FIG. 3, is of such a configuration that, using the difference in appearance (hereinafter, parallax) that occurs when images of the same measurement point, P0, are captured with the cameras 4R, 4L, distance may be determined through the principles of triangulation.

By way of example, assuming that the distance from lenses 5 of the cameras 4R, 4L to measurement point P0 is Z, that the distance between the cameras 4R, 4L is B, that the focal length from a lens 5a of each of the cameras 4R, 4L to an imaging plane 5b is f, and that the parallax is δ, then distance Z may be determined through Equation (1) below. However, it is assumed that all of them are in, for example, millimeters.

[Eq. 1]

$$Z = \frac{B \times f}{\delta} \quad (1)$$

The road shape recognition device 1 is applied to the in-vehicle system 3 shown in FIG. 2. The in-vehicle system 3 is mounted on a vehicle v, and is configured such that, by means of the road shape recognition device 1, the road shape of a road that lies ahead in the travel direction of the vehicle (hereinafter referred to as host vehicle) v is detected, the detection result is sent to the control unit 2, and, based on the detection result, the control unit 2 controls the vehicle or notifies passengers of danger.

As shown in FIG. 2, in addition to the camera 4R and the camera 4L, the road shape recognition device 1 comprises: a CPU 6; RAM 9; program ROM 10; and data ROM 7. Further, the control unit 2 comprises: a CPU 12; RAM 11; program ROM 14; and data ROM 13.

The in-vehicle system 3 is of such a configuration that the road shape recognition device 1 and the control unit 2 are interconnected, and that, further, a display 15, which is installed within the vehicle cabin and is for displaying various images and various information, a speaker 19, which generates a warning sound when there is danger such as overspeeding, etc., when the host vehicle v enters a curve, etc., and so forth, an ignition switch 20, which is turned ON when starting the engine of the host vehicle v, and an activation switch 21, which activates the in-vehicle system 3, are connected, and that the control unit 2 controls the overall operation of the in-vehicle system 3, including display control of the display 15.

The road shape recognition device 1 is, by way of example, attached to a rear-view mirror part within the vehicle cabin, and is adapted to capture an image of a scene ahead of the host vehicle, which is ahead in the travel direction of the host vehicle v, at a predetermined depression angle and attachment position.

Images ahead of the host vehicle captured by the camera 4R and the camera 4L (hereinafter referred to as captured images) are imported to the RAM 9 inside the road shape recognition device 1, and are used to detect a road region of the road ahead of the host vehicle. The road shape recognition device 1 detects a road region based on the images from the cameras 4R, 4L, and calculates the road shape based on the road region.

For the road shape, the road shape recognition device 1 calculates, by way of example, the radius of curvature of a curve and the distance to the entrance of the curve, and draws the detection result as a displayed image on the display 15, or, if the control unit 2 has determined that the speed of the host vehicle is excessive with respect to the road shape estimated by the host vehicle and that there is a risk of deviating from the road, and so forth, under the control of the control unit 2, the driver is notified through the display 15 and the speaker 19, or through either the display 15 or the speaker 19. In addition, the vehicle may also be controlled by the control unit 2 such as having automatic braking applied so as to avoid or mitigate the risk, and so forth.

The display 15 comprises, by way of example, a display device such as an LCD (Liquid Crystal Display), etc., and, under display control by the control unit 2, displays various images, e.g., an image of travel path guidance by a car navigation system not shown in the drawings, an image from the road shape recognition device 1, etc. In addition, if a sharp curve, etc., is recognized by the road shape recognition device 1, the display 15 displays, under the control of the control unit 2, a message notifying the fact that there is a sharp curve, etc.

The control unit 2 has a configuration where the CPU 12, the RAM 11, the data ROM 13 and the program ROM 14 are connected via a bus, and is adapted to control the operation of the system as a whole by having the CPU 12 execute various control programs stored on the program ROM 14.

The road shape recognition device 1 has a road shape recognition program, which detects objects such as lanes, three-dimensional objects, etc., ahead of the host vehicle while also calculating the road shape, stored on the program ROM 10, and is adapted to function as a road region detection unit 31, a road shape estimation unit 32, a road boundary point extraction unit 33, and a road shape calculation unit 34 as in the functional block diagram in FIG. 1 by having the CPU 6 execute these programs as the engine is started, thereby realizing road shape recognition functions. It is noted that since techniques for detecting lanes and three-dimensional objects, etc., are known, they are not shown in the drawings.

The road region detection unit 31 has a function for detecting a road region of a road comprising asphalt, etc., by processing at least either one of the captured images from the camera 4R and the camera 4L. The road shape estimation unit 32 has a function for estimating the road shape of the road based on the road region detected at the road region detection unit 31. The road boundary point extraction unit 33 has a function for extracting a road boundary point between the road and the road exterior. The road shape calculation unit 34 has a function for calculating a more accurate road shape by correcting the road shape estimated by the road shape estimation unit 32 based on the three-dimensional position of the road boundary point extracted by the road boundary point extraction unit 33.

The road shape recognition device 1 thus configured is capable of accurately recognizing a road shape by, as discussed above, having the CPU 6 execute the road shape recognition program, thereby, by way of example, detecting a road region comprising asphalt, etc., even with respect to distant locations where an object, such as a lane, a curb, etc., with which the road shape may be recognized is not visible, or with respect to roads where no such objects exist.

Then, in addition to outputting to the display 15 an image in which the recognition result is superimposed onto an input image, etc., the recognition result is sent to the control unit 2. If, under the control of the control unit 2, it is determined that there are any risks, either decelerating control is performed or the passengers of the vehicle are notified by generating a warning sound.

In performing this decelerating control, mileage may be improved by using engine braking or regenerative braking, or by not performing decelerating control if the traveled path is an uphill slope or if the traveled path leads to an uphill slope, and so forth. In addition, if there is a risk that the host vehicle may deviate from the outputted road shape, turning control or braking control through steering or braking may be performed, or the passengers of the vehicle may be notified by generating a warning sound.

With respect to the road shape recognition device 1 above, the flow of a series of processes from capturing images and calculating the road shape up to outputting results will now be described with reference to a flowchart and drawings.

Figure 4:
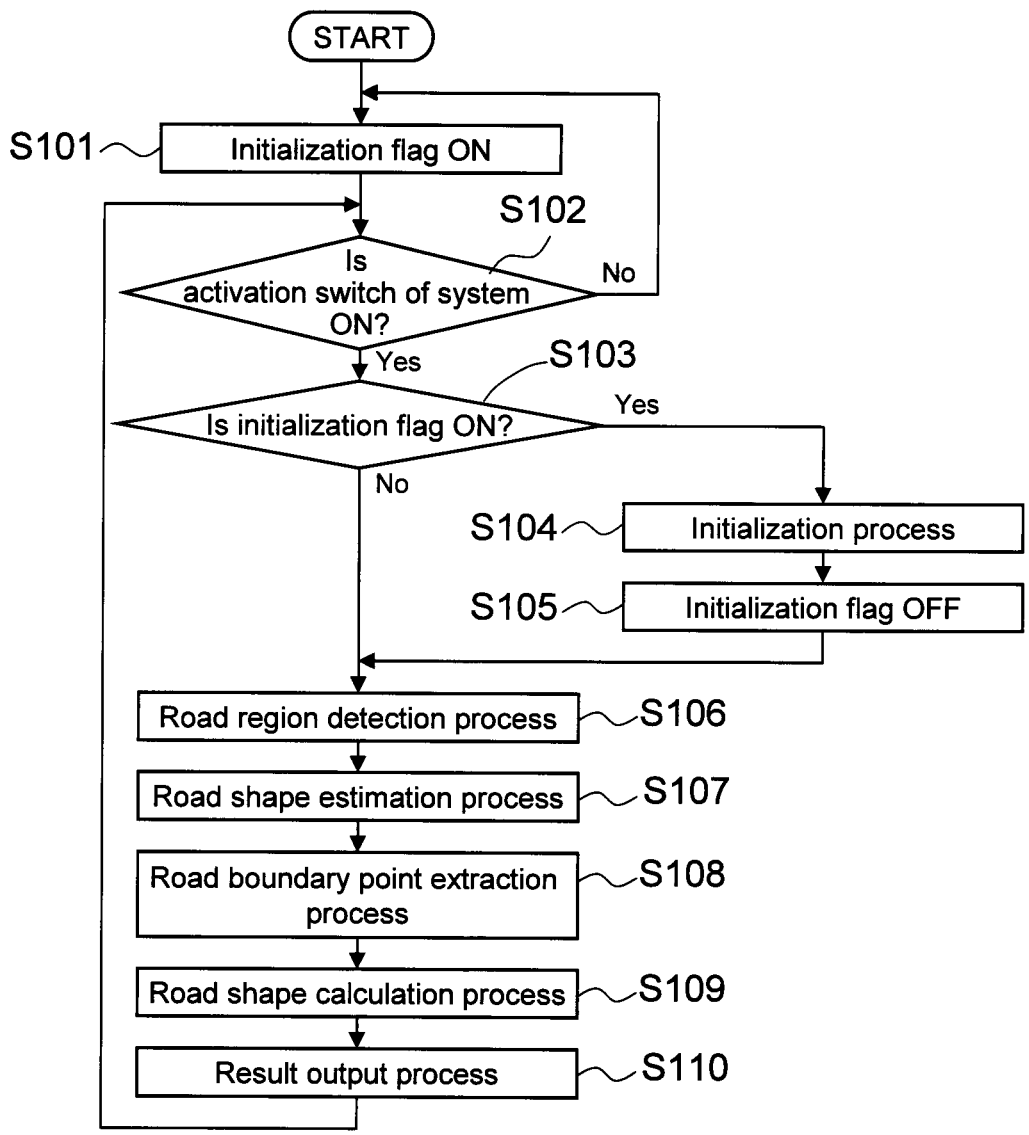
FIG. 4 is a flowchart showing a road shape recognition processing method with respect to the first embodiment.

FIG. 4 is a flowchart showing a road shape recognition processing method with respect to the present embodiment. The series of processes indicated in the flowchart in FIG. 4 starts when the ignition switch 20 (see FIG. 2) becomes ON, and is repeatedly performed until the ignition switch 20 becomes OFF.

Further, it is performed regardless of whether the host vehicle v is traveling or stationary, or of whether the image displayed on the display 15 is a travel path guidance image of a car navigation system (not shown) or some other image. However, the configuration may also be such that whether or not to perform the processes is determined depending on whether the host vehicle v is traveling or stationary, or on whether the image displayed on the display 15 is a travel path guidance image of a car navigation system or some other image.

First, once the ignition switch 20 becomes ON, the road shape recognition program is executed by the road shape recognition device 1, and an initialization flag is set to ON (step S101). Next, it is determined whether or not the activation switch 21 of the in-vehicle system 3 is ON (step S102). Then, if the activation switch 21 of the in-vehicle system 3 is ON, it is determined whether or not the initialization flag is ON (step S103).

Then, if the initialization flag is ON, an initialization process is performed (step S104) such as resetting past road shape recognition results, etc., and the initialization flag is set to OFF (step S105). Further, if, in step S103, the initialization flag is OFF, or once the initialisation flag has been set to OFF in step S105, the process transitions to step S106 and onward to calculate the road shape.

Figure 5:
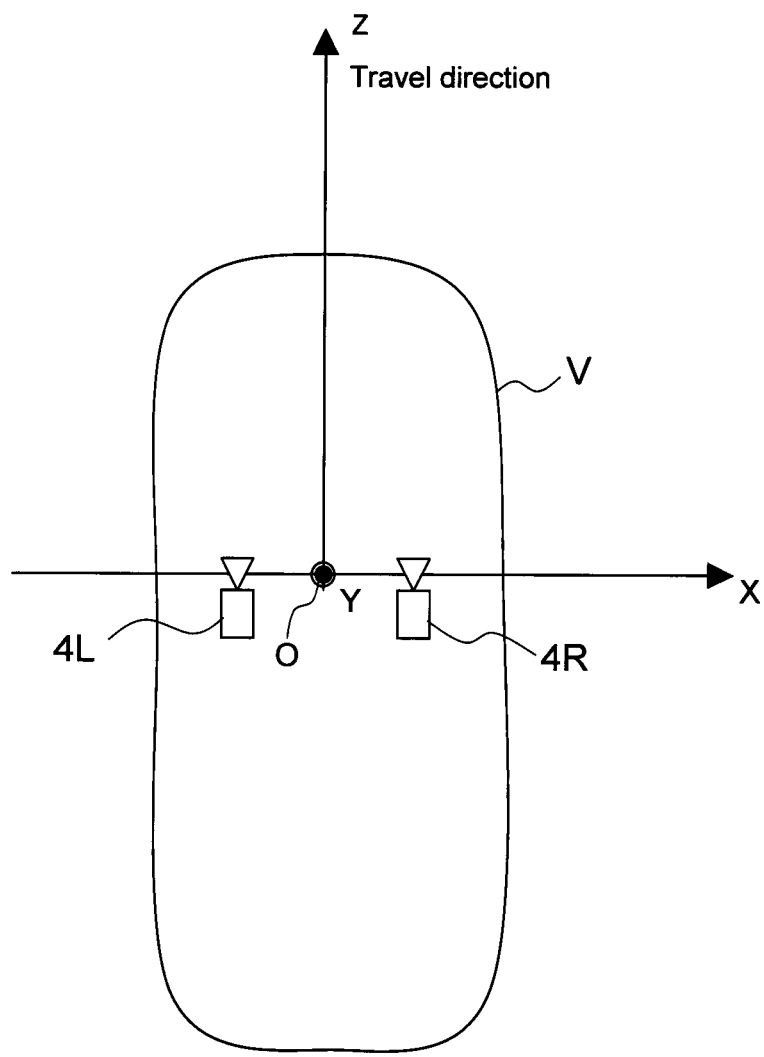
FIG. 5 is a diagram showing a coordinate system for three-dimensional positions of objects.

In step S106, a process is performed where a road region of a road comprising asphalt, etc., is detected, while the three-dimensional position of an object that lies ahead in the travel direction of the host vehicle v is detected based on the difference in its appearance between the camera 4R and the camera 4L. However, it is assumed that three-dimensional coordinate system in this case is represented through a Cartesian coordinate system where, by way of example, as shown in FIG. 5, the midpoint between the camera 4R and the camera 4L is taken to be origin O, the travel direction of the host vehicle the Z-axis, the horizontal direction (car width direction) the X-axis, and the vertical direction the Y-axis.

By way of example, with respect to an object, such as a lane, a three-dimensional object, etc., that lies ahead in the travel direction of the host vehicle v, three-dimensional data that is obtained by processing captured images from the cameras 4R, 4L is analyzed, and a vertical structure is detected as being a three-dimensional object, and white lines that lie horizontally and continuously as being lanes.

By using two or more cameras (hereinafter, a stereo camera), three-dimensional data of high resolution may be obtained, and a small object, such as a lane, a curb, etc., located in proximity to the host vehicle v may be detected with high precision.

In addition, with a stereo camera, since its three-dimensional measurement performance is not, unlike radar devices, etc., dependent upon the reflective characteristics of the object of interest, three-dimensional data may be measured with respect to a diverse range of objects, such as plants, buildings, etc., and with respect to three-dimensional data alongside the road shape, too, more objects may be detected.

The road region detection unit 31 detects a road region using, by way of example, a series of correlation values (FIG. 6(*b*)) between an image from the right camera 4R (hereinafter, right image) and an image from the left camera 4L (hereinafter, left image) obtained when detecting the three-dimensional position of an object by processing captured images.

An example where a road region is detected by calculating a series of correlation values is described below using FIG. 6. FIG. 6 shows diagrams illustrating an example of a road region detection method, where (a) is a diagram showing left and right images captured by left and right cameras, and (b) is a chart showing an example of a series of correlation values.

As shown in FIG. 6(*a*), a window 65R for parallax calculation is defined with respect to a right image 61R. A window 65L of the same size as the window 65R is manipulated in the horizontal direction with respect to a left image 61L. Thus, a correlation value representing how similar the images within the window 65R in the right image 61R and the window 65L in the left image 61L are is calculated (parallax scanning).

The correlation value may be calculated through the sum of absolute differences (SAD) of Equation (2) below, etc., where N is the vertical size of the parallax calculation target window, M the horizontal size, I(i,j) a luminance value for the right image 61R, and T(i,j) a luminance value for the left image 61L.

[Eq. 2]

$$R_{SAD} = \sum_{j=0}^{N-1} \sum_{i=0}^{M-1} |I(i, j) - T(i, j)| \quad (2)$$

Then, by calculating correlation values while shifting the window 65L in the left image 61L by an amount corresponding to a parallax scanning range $S_m$, a series of correlation values is obtained (FIG. 6(*b*)). Then, from among the $S_m$ pieces of correlation values, the minimum, $S_i$, is determined, and $S_i$ is taken to be the parallax.

Here, correlation value $S_{i-1}$, which is adjacent to $S_i$ on the left, is compared with correlation value $S_{i+1}$, which is adjacent on the right. If the difference therebetween is of or below a predetermined value (if they are similar), it is determined that the pixels within the parallax calculation target window 65R in the right image 61R are a road region 62R, and the pixels in question are assigned a road region label.

By way of example, 1 is substituted, as a road region label, into pixel positions that have been determined as being the road region 62R, and 0 is substituted into pixel positions that have been determined as not being a road region (e.g., a sky region 64R, a road exterior region 63R). Then, the parallax calculation target window 65R in the right image 61R is shifted, and the parallax and road region labels for the right image 61R as a whole are obtained.

Examples of road region detection results to which road region labels have been assigned are shown in FIG. 8 and FIG. 9. FIG. 8 shows diagrams indicating road region detection results, where FIG. 8(*a*) is a diagram showing an image 81 of a road 82 that curves to the right in the distance as captured by the camera 4, and FIG. 8(*b*) is a diagram showing an example of a result of detecting a road region with the road region detection unit 31 based on the image 81 in FIG. 8(*a*).

In the image 81 in FIG. 8(*a*), the road 82, a road exterior 83, and a sky 84 are captured. The road 82 within the image 81 is captured in such a manner that it approaches a vanishing point and gradually decreases in size as it moves further away. Accordingly, a region 85 including a curved portion in the distance has low resolution relative to a proximate position, and if a white line or a curb, etc., exists on the road 82, it would be barely recognizable. Therefore, with conventional methods that recognize road shapes by means of white lines, curbs, etc., it was difficult to recognize distant road shapes.

In contrast, the road shape recognition device 1 of the present invention detects a road region of a road by means of the road region detection unit 31. The parts with hatching shown in FIG. 8(*b*) comprise road candidate points, where a road region label of 1 has been assigned to the pixels, and the parts without hatching comprise non-candidate points, where a road region label of 0 has been assigned to the pixels. It is noted that island-like parts 87 shown in FIG. 8(*b*) represent noise. As shown in FIG. 8(*b*), a road region 86 allows recognition of the road shape as a whole, and it is possible to recognize that the road curves to the right in the distance.

FIG. 9 shows diagrams indicating road region detection results, where FIG. 9(*a*) is a diagram showing an image of a road with an uphill slope in the distance as captured by the camera 4, and FIG. 9(*b*) is a diagram showing an example where a road region is detected with the road region detection unit based on the image in FIG. 9(*a*).

In the image 91 in FIG. 9(*a*), a road 92, a road exterior 93, and a sky 94 are captured. The road 92 is captured in such a manner that, as it moves further away within the image 91, it approaches a vanishing point and gradually decreases in size.

Accordingly, a region 95 including an uphill slope portion in the distance has low resolution relative to a proximate position, and if a white line or a curb, etc., exists on the road 92, it would be barely recognizable. Therefore, with conventional methods that recognize road shapes by means of white lines, curbs, etc., it was difficult to recognize distant road shapes.

In contrast, the road shape recognition device 1 of the present invention detects a road region by means of the road region detection unit 31. The parts with hatching shown in FIG. 9(*b*) comprise road candidate points, where a road region label of 1 has been assigned to the pixels, and the parts without hatching comprise non-candidate points, where a road region label of 0 has been assigned to the pixels. It is noted that island-like parts 97 shown in FIG. 9(*b*) represent noise. As shown in FIG. 9(*b*), a road region 96 allows recognition of the road shape as a whole, and since the road extends straight into the distance and, at some position along the way, the gradients of the road edges change in a more upright direction, it is possible to recognize that the gradient of the road changes at some point along the way to become an uphill slope.

By thus detecting a road region using a series of correlation values determined during parallax calculation, processing time may be shortened, thereby improving the responsiveness of the device.

In addition, as a road region detection method, a road region 75 may also be detected by obtaining luminance value and color distributions from a previously detected road region. FIG. 7 shows diagrams indicating another example of a road region detection method, where (*a*) is a right image captured by a right camera, (*b*) is a diagram showing a road region detected from that right image based on luminance, and (*c*) is a diagram showing the luminance distribution and luminance range of the road region.

In a right image 71 shown in FIG. 7(*a*), a road 72, a road exterior 73, and a sky 74 are captured. By way of example, from the right image 71 shown in FIG. 7(*a*), information on the luminance of pixels that exist in a past road region is collected, and the mean value, Bm, the standard deviation, σ, etc., of the luminance distribution are determined. Then, as shown in FIG. 7(*c*), luminances that fall within the range of standard deviation σ, or 2σ, from mean value Bm of the luminance distribution are determined as a luminance range 76 of the road region. Of the luminances of the right image 71, pixels that fall within the luminance range 76 of the road region 72 are assigned a road region label. Thus, it is possible to detect the road region 75 as shown in FIG. 7(*b*), thereby allowing recognition of the road shape as a whole.

In so doing, distributions of luminance values, color, etc., may also be obtained using, instead of a past road region, a road region obtained by predicting the road shape using the vehicle speed, steering angle, etc., of the host vehicle and defining lane width w. Further, a road region derived from the above-mentioned correlation value series and a road region derived from luminance and color distributions may be combined as well.

Further, influences of a road region being blocked by an obstacle on the road may be eliminated by detecting an obstacle on the road, e.g., a parked vehicle, a vehicle ahead, etc., by means of a three-dimensional object detection means, such as a laser radar, a millimeter-wave radar (radar device), etc., not shown in the drawings, and assuming all or part of the region of that obstacle to be a road region.

In addition, in cases where the road region comprises a plurality of luminances and colors, e.g., asphalt and road paint such as a pedestrian crossing, etc., the regions of asphalt and of road paint, etc., may be detected as the road region by determining a plurality of luminance distributions and color distributions for the road region.

In addition, if the in-vehicle system 3 is equipped with a car navigation system that is not shown in FIG. 2, it would also be possible to obtain luminance and color information of the road region by obtaining the shape of the road being traveled, etc., from a map database that the car navigation system has.

By way of example, the car navigation system determines the curve radius based on information in the map database, and sends it to the road shape recognition device 1. At a navigation information obtaining unit of the road shape recognition device 1, by defining the road width and the position of the host vehicle relative to the road in addition to the curve radius obtained from the car navigation system, the road region in the image may be predicted, and luminance and color information within the predicted road region obtained.

In addition, by having the car navigation system obtain such information as the presence/absence of road paint, e.g., a pedestrian crossing, etc., from the map database and send it to the navigation information obtaining unit of the road shape recognition device 1, the road shape recognition device 1 may determine how many luminances and colors the road region comprises based on the information from the car navigation system, and determine a plurality of luminance and color distributions.

Figure 10:
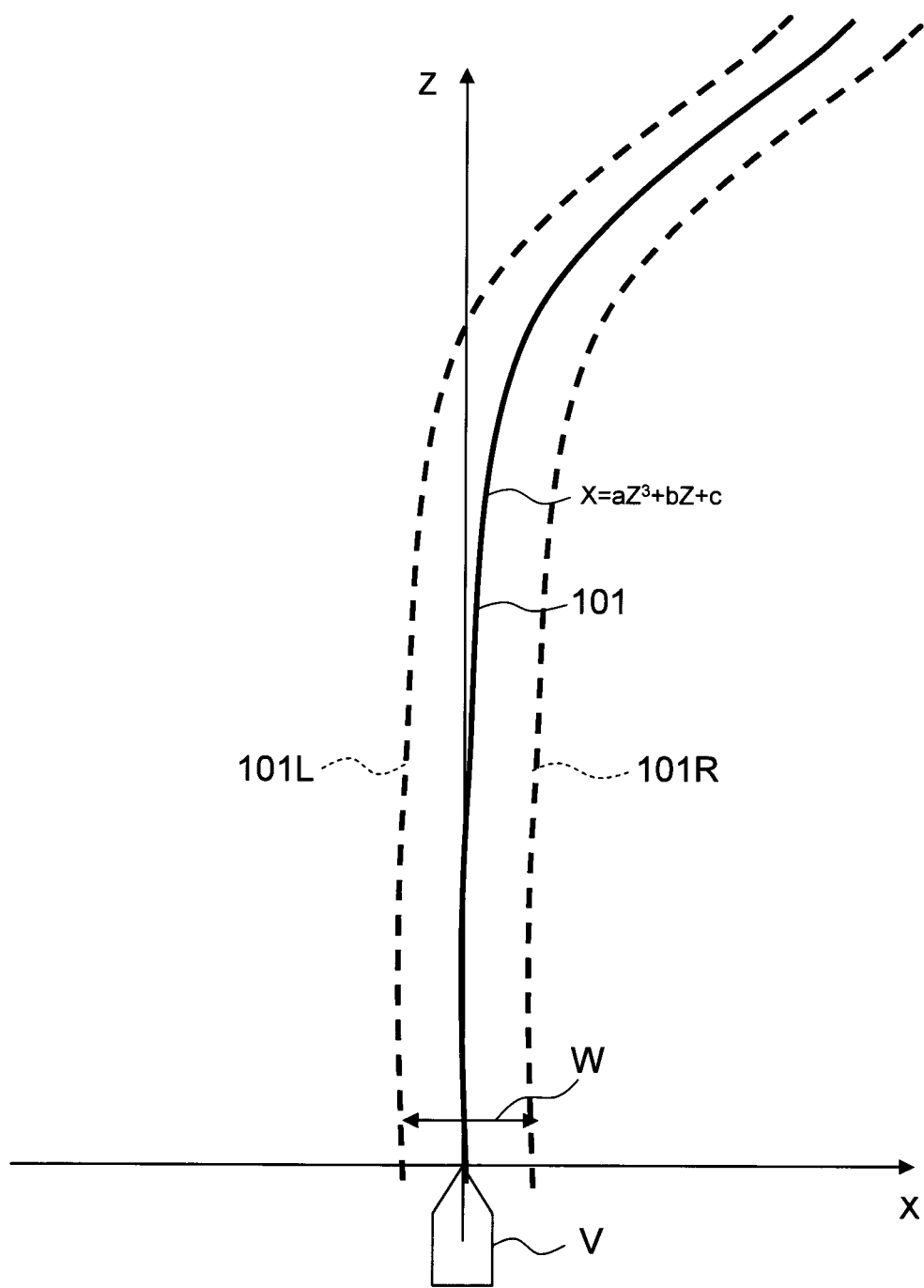
FIG. 10 is a diagram showing an example of a road shape model of a curve that is used in estimating road shapes.
Figure 11:
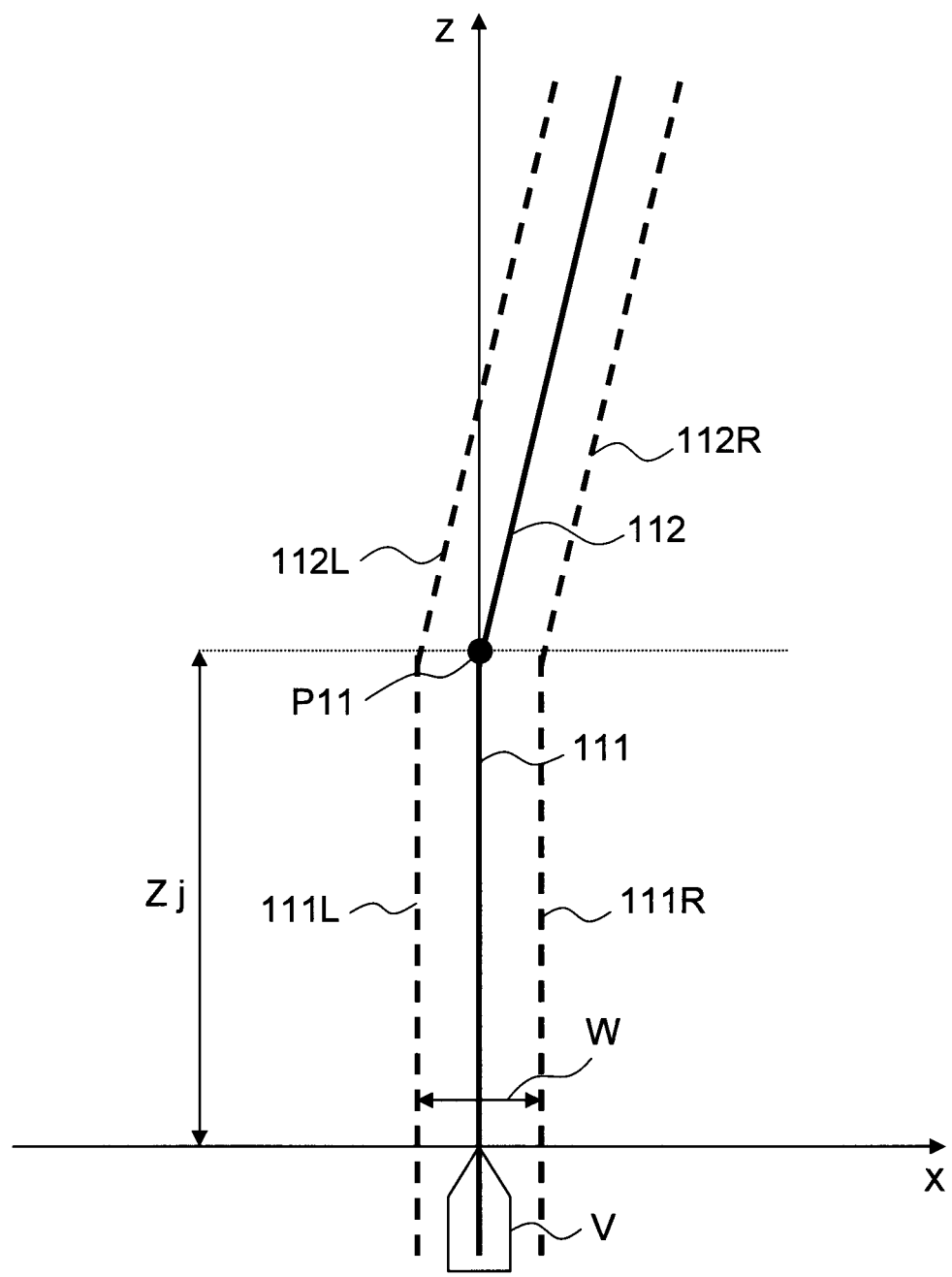
FIG. 11 is a diagram showing an example of a road shape model of a curve that is used in estimating road shapes.
Figure 12:
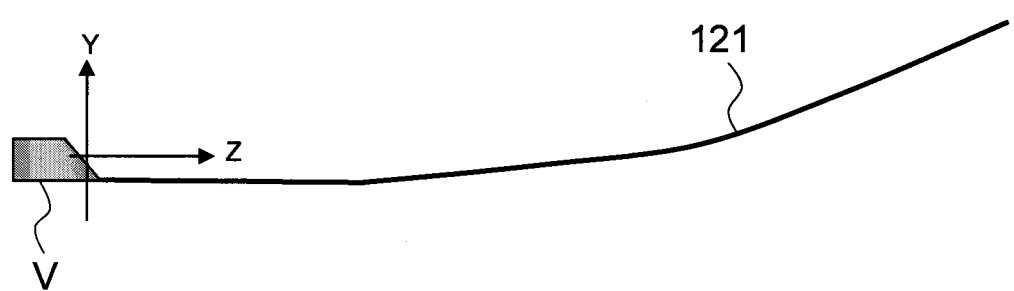
FIG. 12 is a diagram showing an example of a road shape model of a slope that is used in estimating road shapes.

Then, in step S107, a process of estimating the road shape is performed by applying, with respect to the road region detected in step S106, road shape models 101, etc., expressed through a combination of curves, straight lines, etc., such as those in FIG. 10, FIG. 11, and FIG. 12.

FIG. 10 and FIG. 11 are diagrams respectively showing examples of a road shape model of a curve used in estimating road shapes. FIG. 12 is a diagram showing an example of a road shape model of a slope used in estimating road shapes.

The road shape model 101 shown in FIG. 10 is a road shape model that curves to the right with a predetermined radius of curvature with respect to the X-Z plane ($X=aZ^3+bZ+c$). Left and right road edges 101L, 101R are defined opposite each other across road width w.

The road shape model 110 shown in FIG. 11 is a road shape model that bends to the right at connection point P11, which is separated from the host vehicle v by distance Zj ahead in the travel direction with respect to the X-Z plane, and is a combination of a road shape 111 that extends along the Z-axis from the host vehicle v up to connection point P11 ($X=eZ+f$), and a road shape 112 that extends from connection point P11 in the travel direction at a given gradient relative to the Z-axis ($X=gZ+h$). In the road shape model 110, left and right road edges 111L, 112L, 111R, 112R are defined opposite each other across road width w.

The road shape model 121 shown in FIG. 12 is a road shape model of an uphill slope with a predetermined rising gradient with respect to the Y-Z plane ($Y=aZ^3+bZ+c$).

FIG. 13 shows diagrams illustrating a road shape estimation method, where FIG. 13(*a*) is a diagram showing a plurality of road shape model candidates, and FIG. 13(*b*) is a diagram showing a state where the road shape has been estimated by means of a road shape model.

By way of example, an Nc number of candidates for a road shape model 130 are generated as in FIG. 13(*a*), and each of candidates 1 to Nc is converted into an image coordinate system and superimposed over a road region 132 in an image 131 (FIG. 13(b)). Then, the road shape model 130 that resulted in the highest degree of similarity when superimposed is adopted as an estimation result for the road shape. The degree of similarity is, by way of example, determined to be high when many pixels that have been identified as being the road region 132 are included within the road shape.

By thus estimating the road shape using the road shape model 130 in the X-Z plane, it is possible to obtain the road shape in real space. Thus, as shown in FIG. 13(b) for example, although there would be noise 134 in the road region detection result, by comparing the road region 132 as a whole with the road shape model 130, the influence of such noise may be mitigated.

In so doing, since the road surface height, etc., may be found by using a stereo camera for the measurement unit 30, a more precise estimate may be obtained as compared to when other sensors are used. In addition, as shown in FIG. 12, by using the road shape model 121 in the Y-Z plane, it is similarly possible to estimate the road shape of a slope.

In addition, if the in-vehicle system 3 is equipped with a car navigation system that is not shown in FIG. 2, candidates for the road shape model 130 may also be generated by obtaining the shape of the road being traveled, etc., from a map database.

By way of example, the car navigation system obtains the curve radius from the map database and sends it to the road shape recognition device 1. At the road shape recognition device 1, by only generating candidates for the road shape near the curve radius obtained from the car navigation system, the road shape may be estimated efficiently and with favorable precision. In addition, if it is possible to obtain information as to whether an ordinary road or a highway is being traveled, the configuration may also be such that only candidates for a road shape model with a large curve radius are generated on highways.

Further, the configuration may also be such that, in estimating road shapes, road edges, e.g., white lines, curbs, etc., are detected to determine the road width, coefficients of cubic functions, etc., with respect to short ranges, whereas for long ranges, the road shape is estimated using a road region, or the road shape is estimated using road edges, e.g., white lines, curbs, etc., and a road region.

Figure 14:
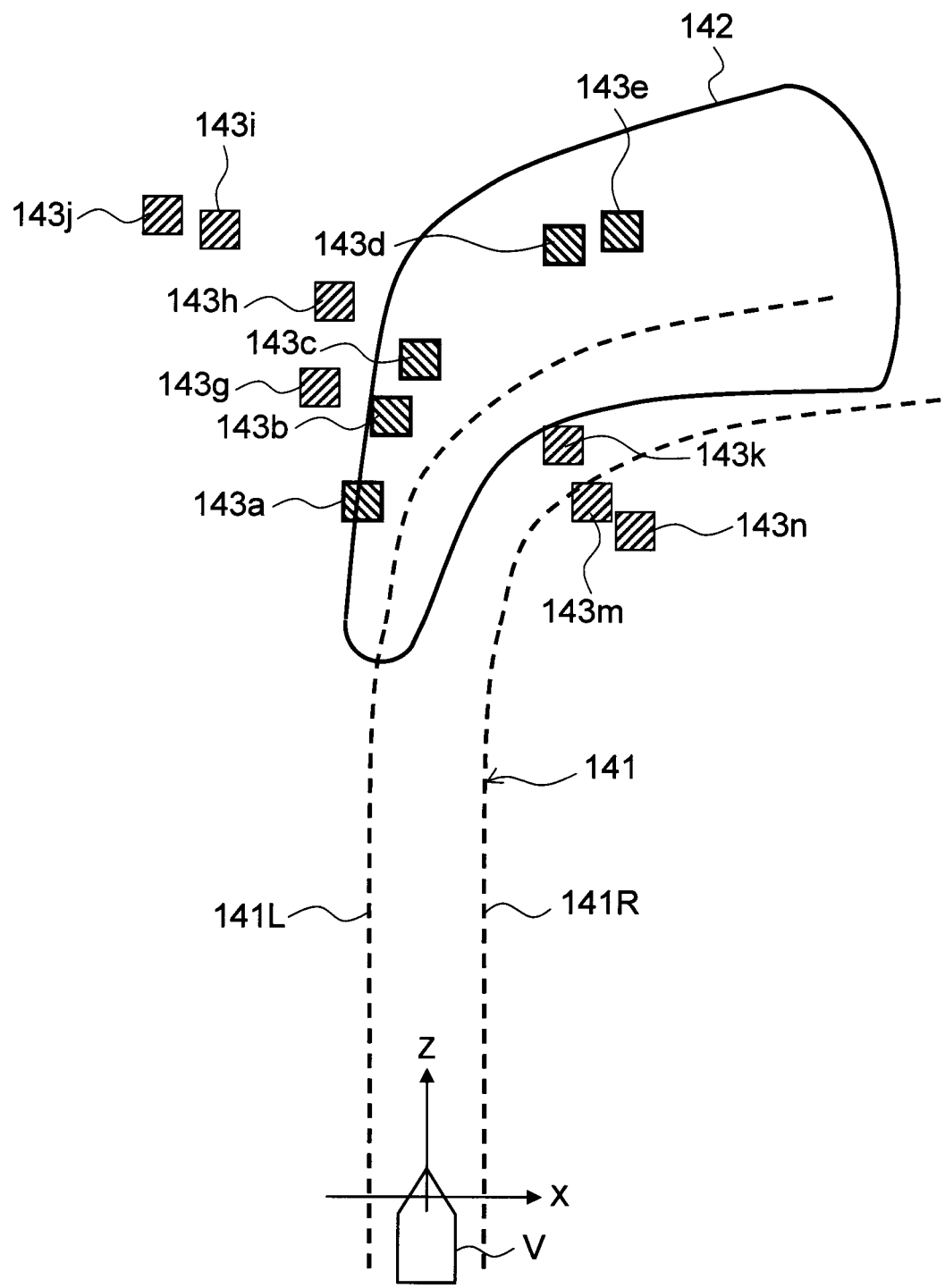
FIG. 14 is a diagram illustrating a method of selecting three-dimensional data that lies at a road boundary of a curve from among three-dimensional data that lies ahead in the travel direction of a vehicle.
Figure 15:
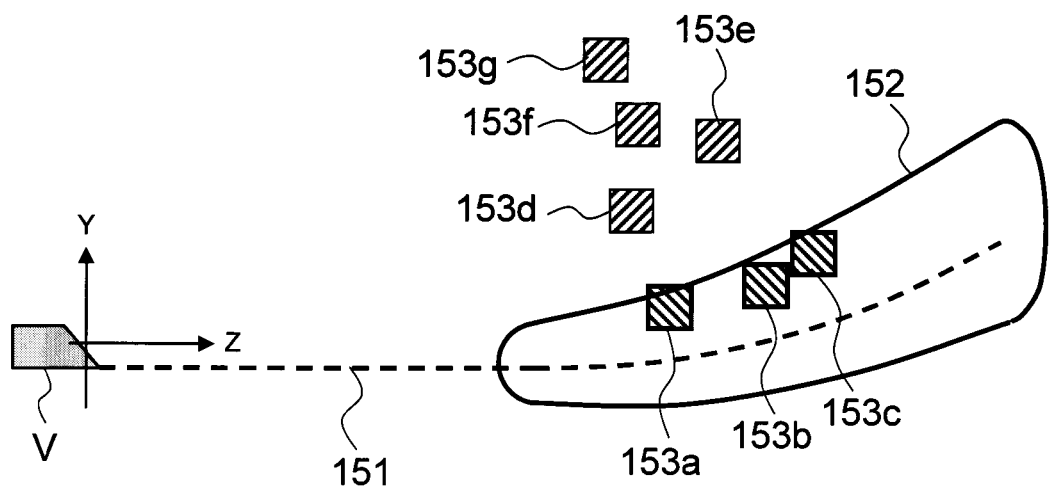
FIG. 15 is a diagram illustrating a method of selecting three-dimensional data that lies at a road boundary of a slope from among three-dimensional data that lies ahead in the travel direction of a vehicle.

In addition, in the road boundary point extraction process in step S108, as shown in FIG. 14 and FIG. 15, a process is performed where, based on road shapes 141, 151 estimated in step S106, three-dimensional data that lies at a boundary between the road and the road exterior is selected from among a three-dimensional data group measured with a stereo camera, and the selected three-dimensional data is extracted as road boundary points.

In the example shown in FIG. 14, of a left road edge 141L and a right road edge 141R, information of the left road edge 141L is used to extract road boundary points. Since the right road edge 141R is sometimes blocked by three-dimensional objects, etc., at right curves, stable results may be obtained by using the left road edge 141L.

In the case of the example shown in FIG. 14, a three-dimensional data extraction region 142 is defined with respect to the left road edge 141L of the road shape 141 estimated through the road shape estimation process in step S107. From among three-dimensional data 143a through 143n detected ahead in the travel direction of the host vehicle v, the three-dimensional data 143a through 143e within the three-dimensional data extraction region 142 are selected as three-dimensional data that lie at the road boundary. Then, the selected three-dimensional data 143a through 143e are extracted as road boundary points.

In addition, in the case of the example shown in FIG. 15, a three-dimensional data extraction region 152 is defined with respect to the road shape 151 estimated through the road shape estimation process in step S107. From among three-dimensional data 153a through 153h detected ahead in the travel direction of the host vehicle v, the three-dimensional data 153a through 153c within the three-dimensional data extraction region 152 are selected as three-dimensional data that lie at the road boundary. Then, the selected three-dimensional data 153a through 153c are extracted as road boundary points.

By way of example, when selecting three-dimensional data that lie at the road boundary, instead of simply selecting the three-dimensional data 143a through 143e and 153a through 153c within the three-dimensional data extraction regions 142, 152, by making the selection taking continuity, etc., into account, road boundary points of even better precision may be extracted.

Further, the configuration may also be such that a three-dimensional object on the road, e.g., a parked vehicle, a vehicle ahead, etc., is detected by means of a three-dimensional object detection means, such as a laser radar, a millimeter-wave radar, etc., not shown in the drawings, and such that three-dimensional data of all or part of the region of that three-dimensional object is not extracted. By excluding three-dimensional objects on the road, such as parked vehicles, vehicles ahead, etc., it becomes possible to determine the same road shape as when there are no three-dimensional objects.

In addition, if the in-vehicle system 3 is equipped with a car navigation system not shown in FIG. 2, it would also be possible to extract road boundary points by obtaining the shape of the road being traveled, etc., from a map database and taking the road shape in the map database into account.

By way of example, the car navigation system obtains the curve radius from the map database and sends it to the road shape recognition device 1. At the road shape recognition device 1, by defining the three-dimensional data extraction regions 142, 152 along the curve radius obtained from the car navigation system, road boundary points may be extracted efficiently and with favorable precision.

Figure 16:
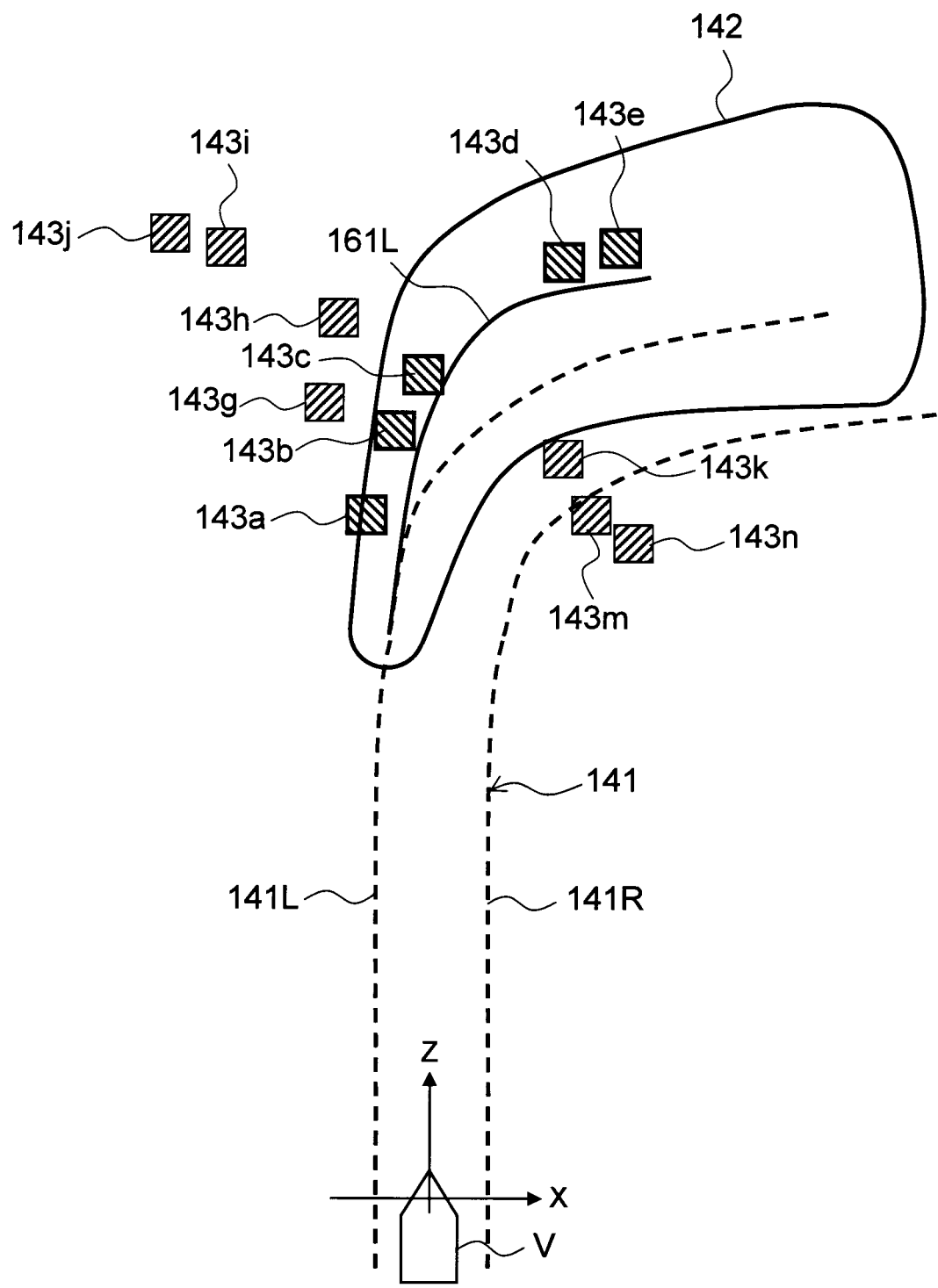
FIG. 16 is a diagram illustrating a road shape calculation method that corrects an estimation result for the road shape of a curve based on road boundary points.
Figure 17:
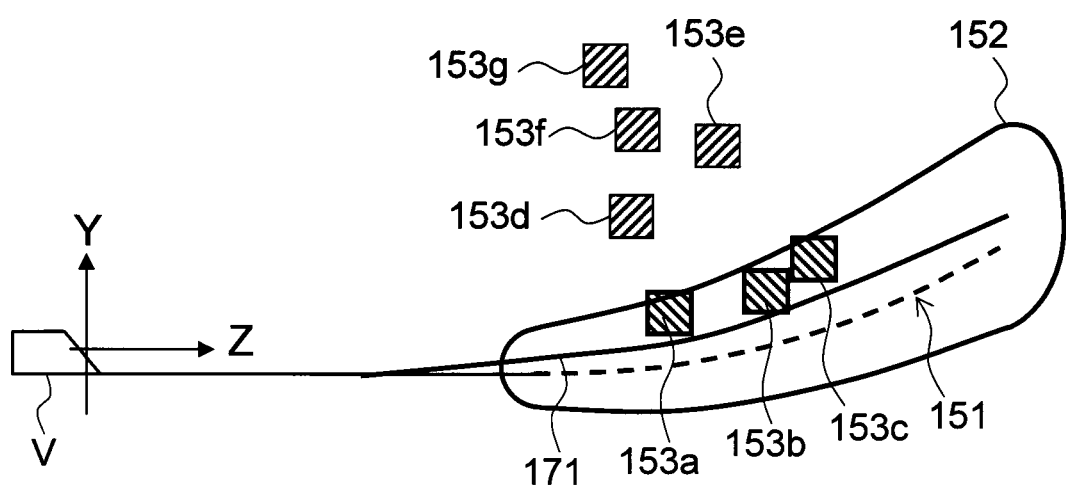
FIG. 17 is a diagram illustrating a road shape calculation method that corrects an estimation result for the road shape of a slope based on road boundary points.

Then, in step S109, a process is performed where the road shape estimated in step S107 is corrected, and the road shape as corrected is calculated. The road shape calculation unit 34 corrects errors in the road shape using the three-dimensional positions of the road boundary points extracted in step S108 as in FIG. 16 and FIG. 17. By way of example, in the case of a curved road shape, by letting the road shape model be the cubic function $X=aZ^3+bZ+c$, and determining coefficient c based on road width w, only a and b need be calculated.

This may be calculated through the method of least squares, etc., as represented by Equation (3) below. Examples of input data for the method of least squares would be a coordinate series for the road shape obtained by sampling the road shape estimated at the road shape estimation unit 32 at predetermined intervals, and a coordinate series for the three-dimensional positions extracted by the road boundary point extraction unit 33. Let these coordinate series be expressed as $(X_i, Z_i)$, where $i=1, 2, \ldots L$, and L is the total number for the sampled road shape coordinate series and the three-dimensional position coordinate series.

[Eq. 3]

$$\begin{bmatrix} \sum_{i=1}^{L} Z_i^6 & \sum_{i=1}^{L} Z_i^4 \\ \sum_{i=1}^{L} Z_i^4 & \sum_{i=1}^{L} Z_i^2 \end{bmatrix} \begin{bmatrix} a \\ b \end{bmatrix} = \begin{bmatrix} \sum_{i=1}^{L} Z_i^3 X_i \\ \sum_{i=1}^{L} Z_i X_i \end{bmatrix} \quad (3)$$

Figure 18:
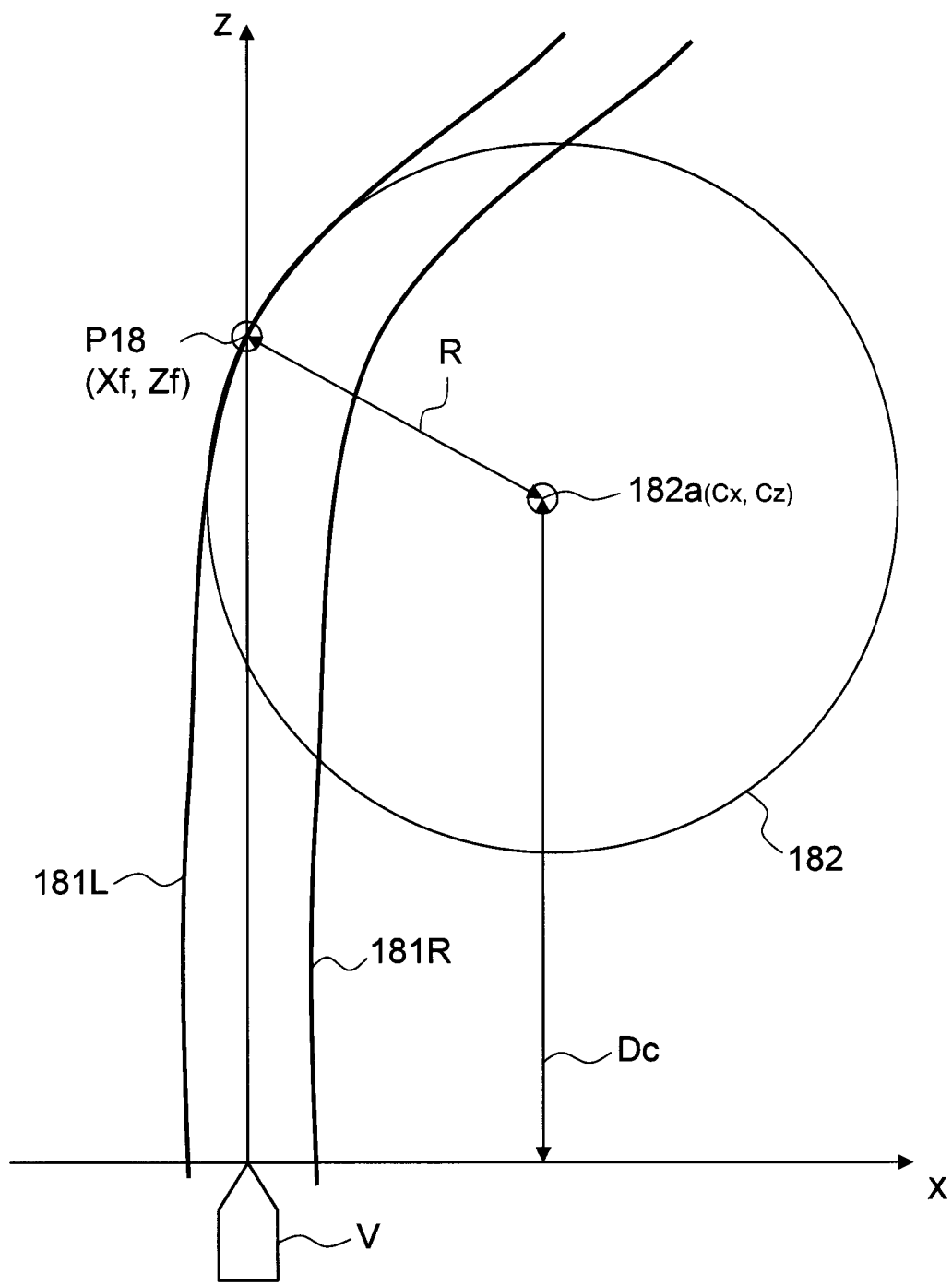
FIG. 18 is a diagram showing an example of a result where a circle that is tangent to a curve and the distance from a vehicle to the curve are calculated by a road shape calculation unit based on a corrected road shape.

In addition, based on either the result of correcting the road shape in step S109 or on the result from the road shape estimation unit 32 in step S107, the road shape calculation unit 34 calculates radius of curvature R of the curve and distance Dc to the curve (FIG. 18). Where the cubic function $X=aZ^3+bZ+c$ is used for the road shape model, radius of curvature R may be calculated through Equation (4) below.

[Eq. 4]

$$R = \frac{(1+3aZ^2+b)^{\frac{3}{2}}}{6aZ} \quad (4)$$

In Equation (4) above, once distance Z is determined, radius of curvature R may be uniquely determined. Thus, as in FIG. 18, point of interest P18 (Xf, Zf) for determining radius of curvature R of the curve is defined. Point of interest P18 (Xf, Zf) may be defined as, by way of example, the point of intersection between the Z-axis and the outer road edge of the curve of a road shape 181 (left road edge 181L in FIG. 18).

Then, as shown in FIG. 18, by determining center 182a (Cx, Cz) of a circle 182 so that radius of curvature R would be in contact with point of interest P18 (Xf, Zf), distance Dc from the host vehicle v to the curve may be defined as Cz, which is the Z-coordinate of the center of the circle 182. In so doing, by approximating the road shape with a plurality of models, e.g., a straight line, a cubic function, etc., results that better resemble the actual road shape may be obtained.

Figure 19:
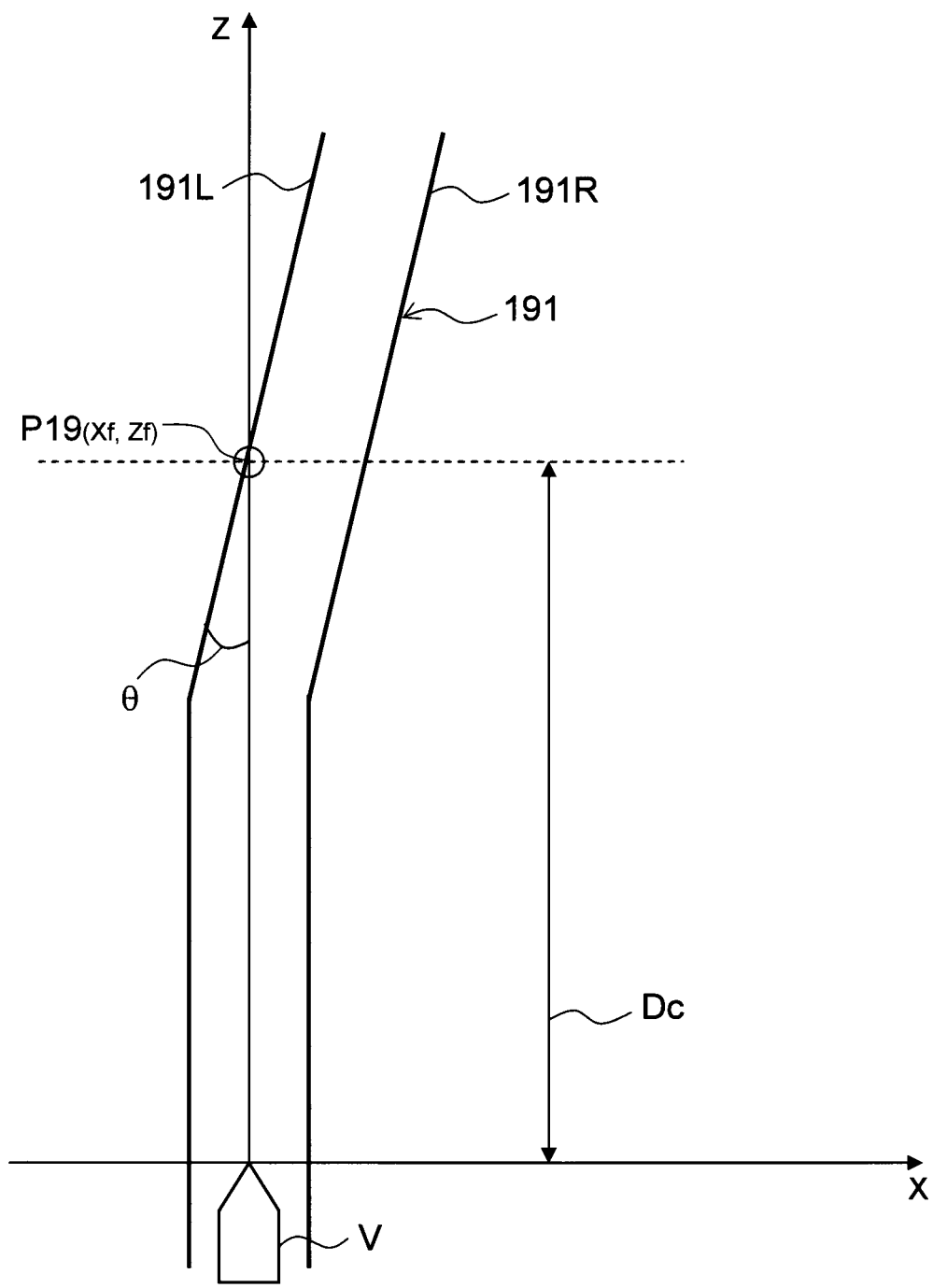
FIG. 19 is a diagram showing an example of a result where the angle of a curve and the distance from a vehicle to the curve are calculated by a road shape calculation unit based on a corrected road shape.
Figure 20:
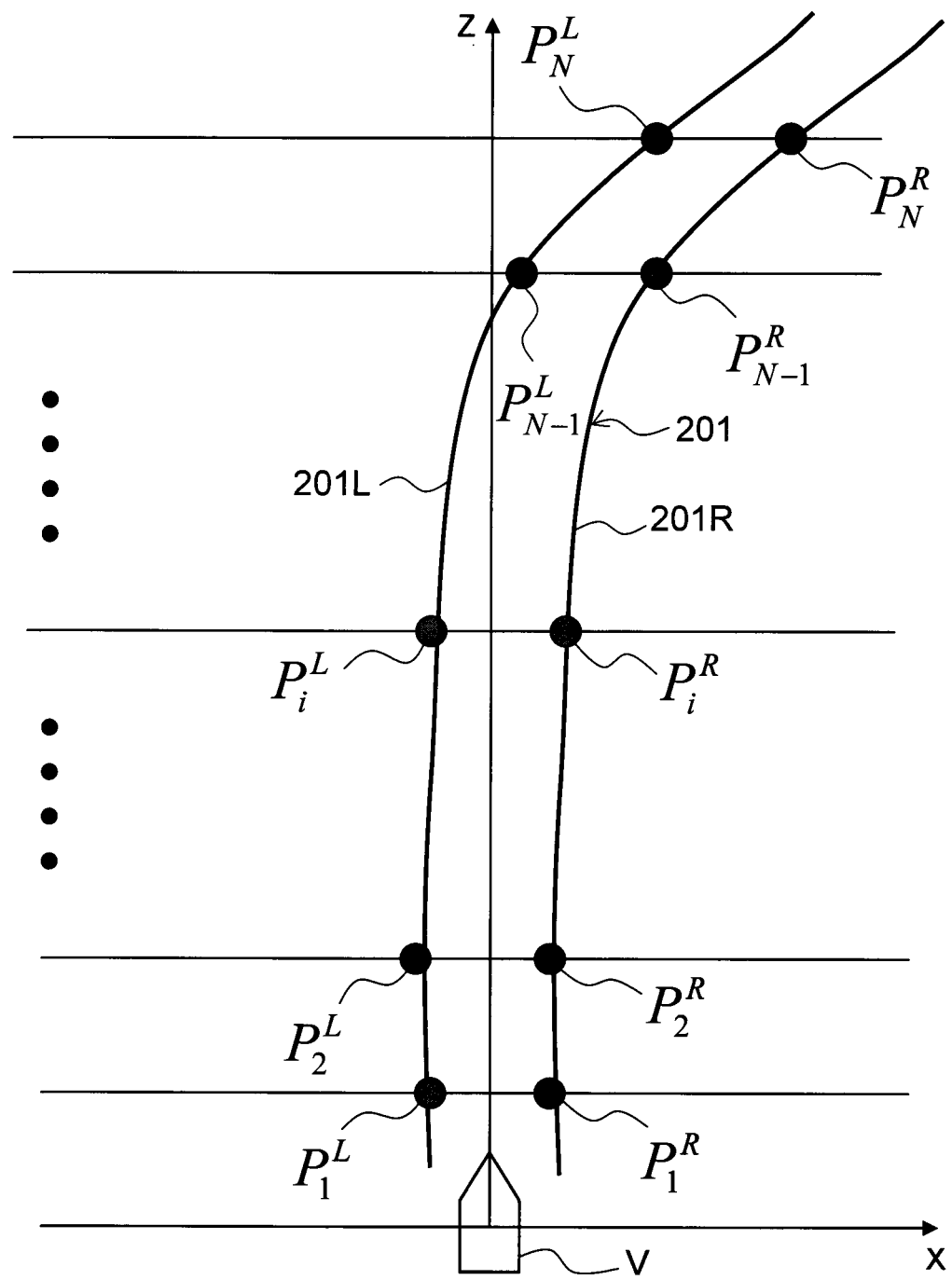
FIG. 20 is a diagram showing an example of a result where positional information of the road edges of a curve is calculated by a road shape calculation unit based on a corrected road shape.

In addition, instead of the radius of curvature of the curve, the angle formed between the Z-axis and a road shape 191 at point of interest P19 (Xf, Zf) may be determined as angle θ of the curve (FIG. 19). Further, as positional information of road edges, the road shape itself determined with a cubic function, etc., may be outputted, or the road shape of a road 201 may be sampled at predetermined distance intervals as in FIG. 20, and a series of positions, PiR, for a right road edge 201R and a series of positions, PiL, for a left road edge 201L may be calculated and outputted, where i is the segment number for the road shape that has been divided into N segments, and assumes values ranging from 1 to N.

Figure 21:
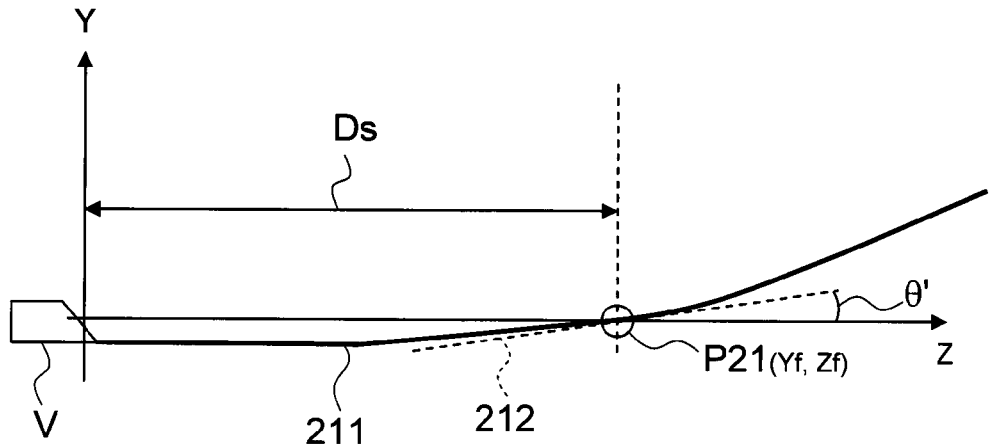
FIG. 21 is a diagram showing an example of a result where the angle of the road gradient of a slope and the distance to the slope are calculated by a road shape calculation unit based on a corrected road shape.

In the case of a slope, as shown in FIG. 21, the point at which the gradient changes is defined as point of interest P21 (Yf, Zf). Then, based on the road shape of a road 211 as corrected, the angle formed between tangent 212 thereto and the Z-axis is determined as gradient angle θ' of the road 211, and distance Ds from the host vehicle v to point of interest P21 is determined (FIG. 21). With respect to slopes, too, coefficients of road shape models, such as cubic functions, etc., and sampled road shape data may be determined and outputted as are done with curves.

Further, if the in-vehicle system 3 is equipped with a car navigation system not shown in FIG. 2, it would also be possible to calculate road shapes with favorable precision by having a navigation information obtaining unit obtain the shape of the road being traveled, etc., from a map database based on a detection signal from a host vehicle position detection unit.

In step S110, at least one result from among the road shapes determined up to step S109 is sent. Based on a road shape calculation result determined by means of the road shape recognition device 1, the control unit 2 determines the control/warning content and performs a process of either controlling the host vehicle v or giving a warning to the passengers, or of both controlling the vehicle v and giving a warning to the passengers.

The process will be described according to the flowchart in FIG. 22. In the present embodiment, a description will be provided with respect to an example where an appropriate vehicle speed is determined in accordance with the road shape, and a decelerating/warning process is performed. However, a process of automatically making a turn, etc., in accordance with the road shape may also be performed.

Figure 22:
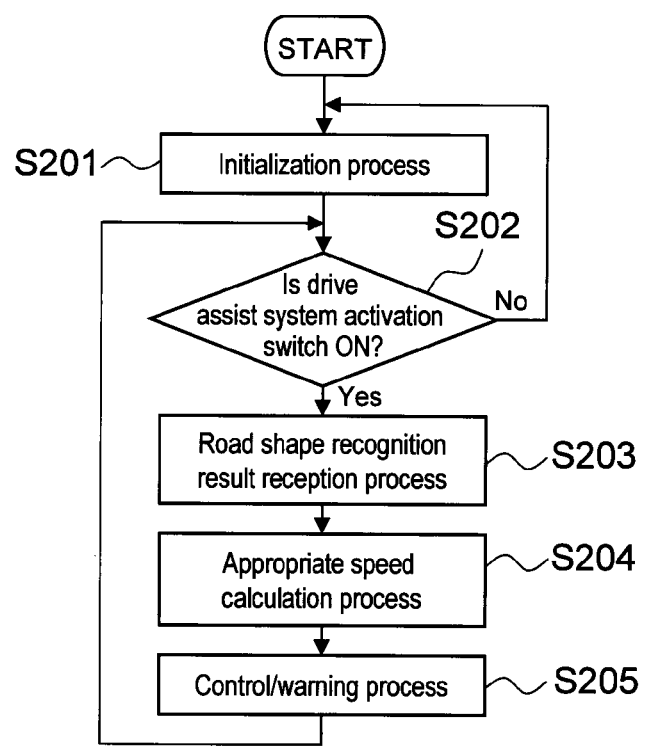
FIG. 22 is a flowchart illustrating processes of a control unit.

The series of processes indicated in FIG. 22 starts when the ignition switch 20 becomes ON, and is repeatedly performed until the ignition switch 20 becomes OFF. It is performed regardless of whether the host vehicle v is traveling or stationary, or of whether the image displayed on the display 15 is a travel path guidance image of a car navigation system or some other image. However, the configuration may also be such that whether or not to perform the processes is determined depending on whether the host vehicle v is traveling or stationary, or on whether the image displayed on the display 15 is a travel path guidance image of a car navigation system or some other image.

First, once the ignition switch 20 becomes ON, a drive assist program is executed by the control unit 2, and an initialization process is performed (step S201). At this point, various programs, such as a car navigation program, etc., may also be run simultaneously. Next, it is determined whether or not the activation switch 21 of the system is ON (step S202). Then, once the activation switch 21 of the system becomes ON, a road shape calculation result reception process is executed, and road shape information is stored on the RAM 11 (step S203).

Next, through step S204, the appropriate speed for the road shape is calculated. By way of example, in the case of a curve, by pre-defining appropriate vehicle speeds with respect to the radius of curvature of the curve and the distance to the curve, the appropriate vehicle speed suitable for the road shape may be obtained.

By means of the road shape recognition device 1 discussed above, it is possible to calculate road shapes up to distant ranges using a road region, and it is possible to determine in real time a target vehicle speed that is appropriate for the road shape. Further, since, with the stereo camera 4, the three-dimensional position of each pixel is determined in addition to the shapes in the image, by appropriately selecting only the three-dimensional data that lies at a road boundary, road shapes may be calculated with favorable precision, enabling vehicle control and warnings that feel less unnatural to passengers.

Then, in step S205, the appropriate vehicle speed determined via step S204 and the vehicle speed of the host vehicle v are compared. If the vehicle speed of the host vehicle v is greater, decelerating control is performed through at least one of braking, engine braking and regenerative braking, or a message, sound or warning is given to warn the driver of overspeeding. With regard to the above, the decelerating control and warning may also be performed simultaneously.

In addition, the warning is given using one of the display 15 and the speaker 19, or both the display 15 and the speaker 19 to warn passengers. In so doing, besides the display 15 and the speaker 19, the warning may be given by, for example, vibrating seat belts, the accelerator, the brake pedal, the steering wheel, seats, etc.

The road shape recognition device 1 to which the present invention is applied is of such a configuration that all processes are executed by the CPU 6. However, part or all of image processing may also be processed by a dedicated LSI for image processing, etc.

As described above, with the road shape recognition device 1 to which the present invention is applied, images captured with the cameras 4R, 4L of the measurement unit 30 are processed to detect a road region comprising asphalt, etc., and a road shape is estimated based on the detected road region. Thus, the road region may be detected with a wider area relative to white lines and curbs, thereby making it possible to calculate road shapes with favorable precision even with respect to roads where there are no white lines, curbs, etc., or distant roads where white lines, curbs, etc., are not visible.

In particular, when a stereo camera is used, not only is the road shape with respect to the image determined, but three-dimensional positions of objects may also be utilized, and the radius of curvature of a curve, etc., may be determined with high precision. Further, if the road boundary point extraction unit 33 and the road shape calculation unit 34 are provided, a road boundary may be detected based on the road shape estimated with the road shape estimation unit 32 and from a three-dimensional data group calculated with the stereo camera, thereby providing an advantage in that road shapes of even higher precision may be calculated.

Further, if, in addition to the configuration of the present embodiment, a car navigation system is provided, a road type, such as whether the road being traveled is a highway or an ordinary road, etc., may be determined based on information on the host vehicle position obtained from a host vehicle position detection unit of the car navigation system, and on map data obtained from a map database of the car navigation system, and a range of values that a coefficient of the road shape may assume may be determined based on road type, etc.

In addition, the configuration may also be such that the series of processes or some of the processes at the road shape recognition device 1 is/are processed within the control unit 2 or by a separate processing device that is not shown in the drawings. In addition, the configuration may also be such that the processes of the control unit 2 are processed within the road shape recognition device 1.

In the present embodiment described above, an example has been presented where the two cameras 4R, 4L are used for the measurement unit 30. However, it may also be a configuration in which only one camera and a radar device, e.g., a laser radar, a millimeter-wave radar, etc., are used, or a configuration that combines a camera, a laser radar, a millimeter-wave radar, etc.

By way of example, similar processes as those of the present embodiment mentioned above may be realized by combining a monocular camera with a radar device, detecting a road region with the monocular camera, and detecting three-dimensional positions of objects with the radar device. It is noted that when combining a plurality of sensors, e.g., a monocular camera and a radar device, etc., it is necessary to determine the attachment positions and attachment angles of the camera and the radar device in advance, and to pre-align the coordinate system. In addition, when configured with a monocular camera alone, although precision will drop compared to a stereo camera, a combination of a monocular camera and a radar device, etc., it would still be possible to calculate road shapes.

Further, instead of applying road shapes in two-dimensional planes, e.g., X-Z plane, Y-Z plane, etc., by applying flat planes and curved planes in an X-Y-Z space, road shapes such as banks, etc., may also be estimated in addition to curves and slopes.

By calculating the appropriate speed for traveling the road shape detected from at least one of distance Dc to the curve, radius of curvature R of the curve, curve tangent angle $\theta$, distance to slope Ds, and gradient $\theta'$ outputted by the road shape recognition device 1, vehicle control and a warning process suited to the road shape become possible.

Second Embodiment

Figure 23:
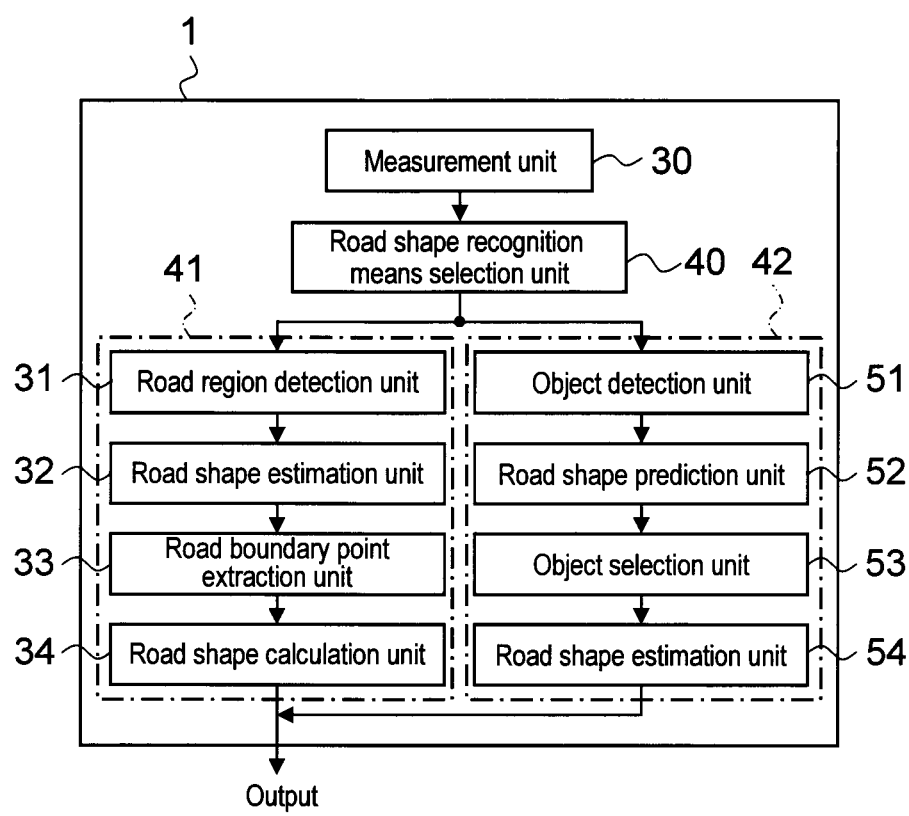
FIG. 23 is a functional block diagram of a road shape recognition device with respect to the second embodiment.

FIG. 23 is a functional block diagram of a road shape recognition device with respect to the second embodiment.

As shown in FIG. 23, a road shape recognition device 1' with respect to the present embodiment comprises a selection unit 40, a first recognition unit 41, and a second recognition unit 42. The selection unit 40 selects the first recognition unit 41 when the presence/absence or view, etc., of three-dimensional objects around the road is favorable, and selects the second recognition unit 42 when the view is compromised due to three-dimensional objects around the road, creating blind spots in parts of the road shape ahead.

The first recognition unit 41 recognizes a road shape based on a road region. The content of that process is similar to that in the first embodiment discussed above, and a detailed description thereof will therefore be omitted herein. The second recognition unit 42 detects objects that lie ahead in the travel direction, and recognizes a road shape based on the three-dimensional positions of the objects. It comprises an object detection unit 51, a road shape prediction unit 52, an object selection unit 53, and a road shape estimation unit 54.

The object detection unit 51 has a function for detecting objects by processing captured images from the camera 4R, 4L that form the measurement unit 30. The objects may include road markings, e.g., lanes, etc., and three-dimensional objects, e.g., curbs, trees, buildings. In this case, in addition to detecting objects, their three-dimensional positions are also measured.

The road shape prediction unit 52 has a function for predicting a distant road shape based on a lane detected at the object detection unit 51. In addition to lanes, this prediction may also be predicted based on three-dimensional objects that form roads, e.g., guard rails, curbs, etc., and there are by no means any such restrictions that it must be based on lanes.

The object selection unit 53 has a function for selecting three-dimensional objects near the road shape predicted by the road shape prediction unit 52. The road shape estimation unit 54 has a function for re-determining the road shape using the three-dimensional positional information of the three-dimensional objects selected by the object selection unit 53 and the lane information that was used in predicting the road shape at the road shape prediction unit 52.

The second recognition unit 42 having the configuration above processes images captured at the cameras 4R, 4L, predicts the road shape based on objects forming the road, e.g., lanes, curbs, etc., and correctly selects three-dimensional objects including buildings, trees, etc., that lie alongside the road based on results predicted by way of lanes, etc., forming the road shape. Accordingly, it is possible to utilize positional information of other three-dimensional objects in addition to white lines, curbs, etc., thereby realizing high-precision road shape estimation.

In particular, when the stereo camera 4 is used, not only is it possible to detect lanes and curbs, but their three-dimensional positions may also be obtained. Accordingly, the road shape may be predicted with favorable precision, while at the same time a diverse range of three-dimensional objects including plants may be detected, and positional information of many three-dimensional objects may be utilized.

In addition, the road shape estimation unit 54 of the second recognition unit 42 calculates the distance between objects that form the road, e.g., lanes, etc., and objects that lie alongside the road, e.g., buildings, etc., and corrects the positional information of three-dimensional objects that are used to estimate the road shape, as a result of which it is capable of absorbing positional errors of objects that form the road shape, e.g., lanes, etc., and objects that lie alongside the road, e.g., buildings, etc. Road shape estimation of higher precision thus becomes possible. In addition, it may also be configured such that, instead of calculating the distance between objects that form the road, e.g., lanes, etc., and objects that lie alongside the road, e.g., buildings, etc., the number of lanes on the left of the lane traveled by the host vehicle and the number of lanes on the right are determined, and positional information of three-dimensional objects that are used to estimate the road shape is corrected in accordance with the number of lanes.

With the road shape recognition device 1' thus configured, if the view is compromised due to three-dimensional objects, creating blind spots in parts of the road shape ahead, by having the selection unit 40 select the second recognition unit 42, road shapes may be calculated without any drop in precision even with respect to roads with compromised views.

Third Embodiment

Figure 24:
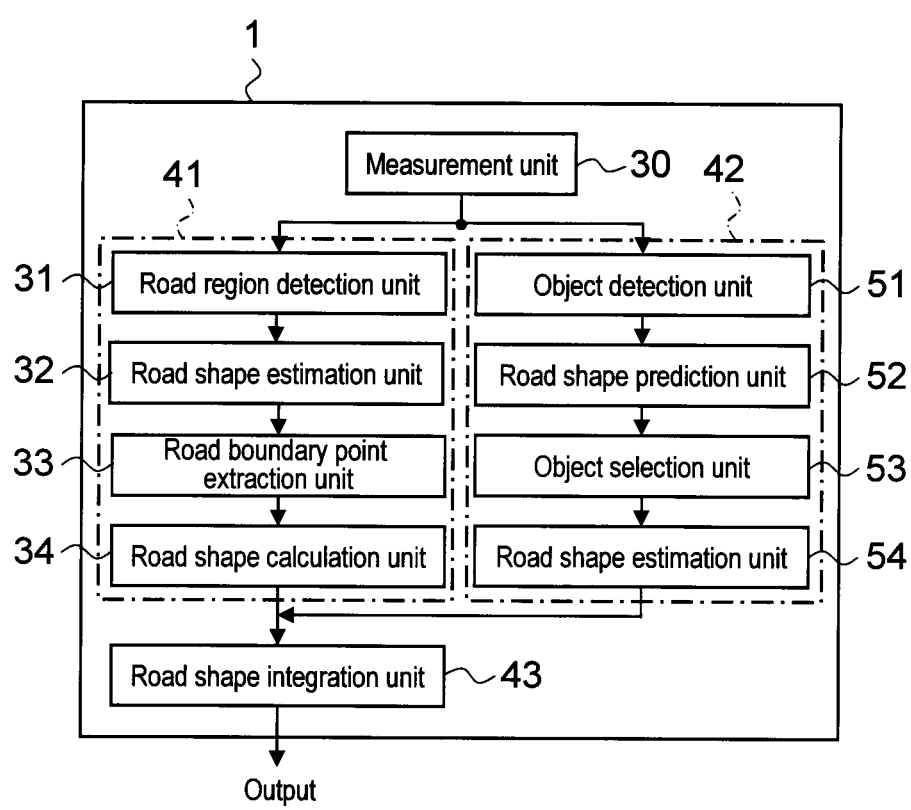
FIG. 24 is a functional block diagram of a road shape recognition device with respect to the third embodiment.

FIG. 24 is a functional block diagram of a road shape recognition device with respect to the third embodiment.

As shown in FIG. 24, a road shape recognition device 1" with respect to the present embodiment comprises the first recognition unit 41, the second recognition unit 42, and a road shape integration unit 43. The first recognition unit 41 and the second recognition unit 42 are similar to those in the embodiments discussed above, and detailed descriptions thereof will therefore be omitted herein.

With the road shape recognition device 1", both a process of calculating the road shape based on a road region at the first recognition unit 41 and a process of calculating the road shape using three-dimensional objects at the second recognition unit 42 are performed. The road shape integration unit 43 selects either road shape based on the presence/absence of three-dimensional objects, etc., or calculates the average of the two, etc., to integrate them and output one road shape. Thus, road shapes may be calculated without any drop in precision even with respect to roads with compromised views, etc.

Whether or not the road shape recognition device 1" with respect to the present embodiment is operating properly may be checked by comparing whether or not road shapes are calculable, detection rates for road shapes, detection distances for road shapes, and calculation precision for road shapes among a road with a favorable view and that has lanes, a road with a favorable view and that does not have lanes, a road with a poor view and that has lanes, a road with a poor view and that does not have lanes, and so forth.

The present invention is by no means limited to the embodiments discussed above, and various modifications may be made within a scope that does not depart from the spirit of the present invention.

The invention claimed is:

1. A road shape recognition device that recognizes a road shape of a road that lies ahead in a travel direction of a vehicle, the road shape recognition device comprising:
    an image capturing unit that captures an image ahead in the travel direction of the vehicle;
    a road region detection unit that detects, based on the image captured by the image capturing unit without using a line on the road, a road region of the image which is occupied by the road; and
    a road shape estimation unit that estimates the road shape of the road based on the road region detected by the road region detection unit,
    wherein the road region detection unit detects the road region based on at least one of luminance information and color information of the image captured by the image capturing unit, and
    wherein the road region detection unit obtains information of at least one of luminance and color distributions of a previously detected road region from a past image from which the previously detected road region has been detected by the road region detection unit in the past, and detects the road region of the road from the image based on the obtained information.

2. The road shape recognition device according to claim 1, further comprising a navigation information obtaining unit that obtains map data of a vicinity of a host vehicle position from a map database, wherein
    the road region detection unit detects the road shape of the road from the image based on information of at least one of luminance and color distributions of a road region obtained from the map database.

3. The road shape recognition device according to claim 1, wherein the road region detection unit detects as the road region all or part of an obstacle on the road captured by the image capturing unit.

4. The road shape recognition device according to claim 1, wherein
    the image capturing unit comprises a plurality of cameras, and
    the road region detection unit detects a three-dimensional position of an object that lies ahead in the travel direction of the vehicle by processing respective images captured by the plurality of cameras, and detects the road region based on a series of correlation values among the images obtained from the plurality of cameras in detecting the three-dimensional position of the object.

5. The road shape recognition device according to claim 1, wherein the road shape estimation unit determines a similarity degree in shape between the road region detected by the road region detection unit and each of a plurality of pre-defined road shape models, and adopts a road shape model for which the similarity degree is highest as the road shape of the road.

6. The road shape recognition device according to claim 5, wherein the road shape estimation unit generates the plurality of road shape models based on the road region detected by the road region detection unit.

7. The road shape recognition device according to claim 5, further comprising a navigation information obtaining unit that obtains map data of a vicinity of a host vehicle position from a map database, wherein the road shape estimation unit generates candidates of the road shape models based on information of the road shape obtained from the map database.

8. The road shape recognition device according to claim 5, wherein the road shape estimation unit estimates as the road shape at least one of: a radius of curvature of a curve of the road; a distance to the curve; an angle of a tangent to the curve; a gradient of a slope of the road; a distance to the slope; relative positions of the vehicle and the curve or of the vehicle and the slope; and a road shape model coefficient obtained by approximating the road shape of the road with a road shape model.

9. The road shape recognition device according to claim 1, further comprising:
   a road boundary point extraction unit that extracts a road boundary point between the road and a road exterior; and
   a road shape calculation unit that corrects the road shape estimated by the road shape estimation unit based on the road boundary point extracted by the road boundary point extraction unit.

10. The road shape recognition device according to claim 9, wherein the road boundary point extraction unit selects three-dimensional data that lies at a boundary between the road and the road exterior from among three-dimensional data that lies ahead in the travel direction of the vehicle based on the road shape estimated by the road shape estimation unit, and extracts the selected three-dimensional data as the road boundary point.

11. The road shape recognition device according to claim 10, further comprising a radar device that detects three-dimensional data of an object that lies ahead in the travel direction of the vehicle, wherein
   the road boundary point extraction unit extracts three-dimensional data that lies at the boundary from a detection result of the radar device.

12. The road shape recognition device according to claim 10, wherein the road boundary point extraction unit excludes three-dimensional data of an obstacle, such as a parked vehicle, a vehicle ahead, and the like, that lies on the road from the three-dimensional data that lies at the boundary.

13. The road shape recognition device according to claim 9, further comprising a navigation information obtaining unit that obtains map data of a vicinity of a host vehicle position from a map database, wherein
   the road boundary point extraction unit extracts the road boundary point based on information of the road shape obtained from the map database.

14. The road shape recognition device according to claim 9, wherein the road shape calculation unit calculates as the road shape at least one of: a radius of curvature of a curve of the road; a distance to the curve; an angle of a tangent to the curve; a gradient of a slope of the road; a distance to the slope; relative positions of the vehicle and the curve or of the vehicle and the slope; and a road shape model coefficient obtained by approximating the road shape of the road with a road shape model.

15. The road shape recognition device according to claim 9, further comprising a navigation information obtaining unit that obtains map data of a vicinity of a host vehicle position from a map database, wherein
   the road shape calculation unit corrects the road shape based on information of the road shape obtained from the map database.

16. A road shape recognition device that recognizes a road shape of a road that lies ahead in a travel direction of a vehicle, the road shape recognition device comprising:
   a first recognition unit that detects, based on an image capturing a scene ahead in a travel direction of the vehicle without using a line on the road, a road region of the image which is occupied by the road, and calculates the road shape of the road based on the road region detected;
   a second recognition unit that detects a three-dimensional position of an object that lies ahead in the travel direction of the vehicle based on the image capturing the scene ahead in the travel direction of the vehicle, and calculates the road shape of the road based on the detected three-dimensional position of the object; and
   a selection unit that selects one of the first recognition unit and the second recognition unit based on whether or not a three-dimensional object lies in a road vicinity of the road or on a view condition, and causes the selected unit to calculate the road shape.

17. The road shape recognition device according to claim 16, wherein
   the first recognition unit comprises:
      an image capturing unit that captures an image ahead in the travel direction of the vehicle;
      a road region detection unit that detects the road region of the road based on the image captured by the image capturing unit; and
      a road shape estimation unit that estimates the road shape of the road based on the road region detected by the road region detection unit, and
   the second recognition unit comprises:
      a detection unit that detects the three-dimensional position of the object that lies ahead of the vehicle;
      a road shape prediction unit that estimates a distant road shape based on the three-dimensional position of the object detected at the detection unit;
      three-dimensional object selection means that selects a three-dimensional object near the road shape predicted by the road shape prediction unit; and
      a road shape calculation unit that re-calculates the road shape using three-dimensional positional information of the three-dimensional object selected by the three-dimensional object selection means, and information of an object that forms the road, such as a lane, a curb, and the like, that has been used at the road shape prediction unit in predicting the road shape.

18. A road shape recognition device that recognizes a road shape of a road that lies ahead in a travel direction of a vehicle, the road shape recognition device comprising:
   a first recognition unit that detects, based on an image capturing a scene ahead in the travel direction of the vehicle without using a line on the road, a road region of the image which is occupied by the road, and calculates the road shape of the road based on the road region detected;
   a second recognition unit that detects a three-dimensional position of an object that lies ahead in the travel direction of the vehicle based on the image capturing the scene ahead in the travel direction of the vehicle, and calculates the road shape of the road based on the detected three-dimensional position of the object; and
   a road shape integration unit that integrates the road shape of the road calculated by the first recognition unit and the road shape of the road calculated by the second recognition unit to output one road shape.

* * * * *